United States Patent
Padmanabhan et al.

(10) Patent No.: US 11,880,372 B2
(45) Date of Patent: Jan. 23, 2024

(54) DISTRIBUTED METADATA DEFINITION AND STORAGE IN A DATABASE SYSTEM FOR PUBLIC TRUST LEDGER SMART CONTRACTS

(71) Applicant: Salesforce, Inc., San Francisco, CA (US)

(72) Inventors: Prithvi Krishnan Padmanabhan, San Francisco, CA (US); Gary Brandeleer, San Francisco, CA (US); Avanthika Ramesh, San Francisco, CA (US); Adam Caplan, Chicago, IL (US); Angus Dunn, San Francisco, CA (US); Dan Xu, San Francisco, CA (US); Chinmay Gore, Kirkland, WA (US); Aditya Nikhil Desai, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/662,812

(22) Filed: May 10, 2022

(65) Prior Publication Data
US 2023/0367776 A1 Nov. 16, 2023

(51) Int. Cl.
*G06F 16/2457* (2019.01)
*H04L 9/32* (2006.01)
(Continued)

(52) U.S. Cl.
CPC .... *G06F 16/24573* (2019.01); *G06F 16/2282* (2019.01); *G06F 16/252* (2019.01); *H04L 9/3236* (2013.01)

(58) Field of Classification Search
None
See application file for complete search history.

(56) References Cited

U.S. PATENT DOCUMENTS

| | | |
|---|---|---|
| 10,585,657 B2 | 3/2020 | Padmanabhan |
| 10,701,054 B2 | 6/2020 | Padmanabhan |
| (Continued) | | |

FOREIGN PATENT DOCUMENTS

| | | |
|---|---|---|
| AU | 2019345039 A1 | 4/2021 |
| AU | 2019345040 A1 | 4/2021 |
| (Continued) | | |

OTHER PUBLICATIONS

U.S. Appl. No. 16/294,646, Corrected Notice of Allowance dated Jun. 30, 2021, 11 pgs.
(Continued)

*Primary Examiner* — Kim T Nguyen
(74) *Attorney, Agent, or Firm* — Polygon IP, LLP

(57) ABSTRACT

A plurality of metadata entries may be sent from a database system to a distributed storage system via a communication interface. The metadata entries may correspond with a respective plurality of metadata identifiers. A first function in a smart contract deployed on a blockchain may be executed to mint a designated non-fungible token initially owned by a first blockchain party corresponding with a database system account. A first transaction transferring the designated non-fungible token to a second blockchain party different from the first blockchain party may be identified. A second function in the smart contract may be executed to record a second transaction updating an attribute value associated with the designated non-fungible token to include a designated one of the plurality of metadata identifiers corresponding with a designated one of the metadata entries.

20 Claims, 22 Drawing Sheets

(51) Int. Cl.
*G06F 16/22* (2019.01)
*G06F 16/25* (2019.01)

(56) References Cited

U.S. PATENT DOCUMENTS

| | | | |
|---|---|---|---|
| 10,915,891 B1 | 2/2021 | Winklevoss | |
| 11,038,771 B2 | 6/2021 | Padmanabhan | |
| 11,082,226 B2 | 8/2021 | Hildebrand | |
| 11,113,219 B2* | 9/2021 | Khandelwal | G06F 13/364 |
| 11,128,465 B2 | 9/2021 | Hildebrand | |
| 11,144,335 B2 | 10/2021 | Padmanabhan | |
| 11,157,484 B2 | 10/2021 | Padmanabhan | |
| 11,200,569 B1 | 12/2021 | James | |
| 11,244,313 B2 | 2/2022 | Padmanabhan | |
| 11,288,280 B2 | 3/2022 | Padmanabhan | |
| 11,308,487 B1 | 4/2022 | Foster | |
| 11,315,138 B1 | 4/2022 | Olson | |
| 11,372,635 B2 | 6/2022 | Padmanabhan | |
| 11,430,066 B2 | 8/2022 | Doney | |
| 11,431,486 B2 | 8/2022 | Padmanabhan | |
| 11,431,693 B2 | 8/2022 | Padmanabhan | |
| 11,468,406 B2 | 10/2022 | Padmanabhan | |
| 11,469,886 B2 | 10/2022 | Padmanabhan | |
| 11,488,176 B2 | 11/2022 | Padmanabhan | |
| 11,509,719 B2* | 11/2022 | Sittisombut | H04L 67/1097 |
| 11,611,560 B2* | 3/2023 | Padmanabhan | H04L 63/102 |
| 11,743,137 B2* | 8/2023 | Padmanabhan | H04L 9/3239 |
| | | | 715/736 |
| 11,764,950 B2* | 9/2023 | Padmanabhan | G06F 16/13 |
| | | | 707/827 |
| 11,770,445 B2* | 9/2023 | Padmanabhan | H04L 67/104 |
| | | | 709/203 |
| 11,783,024 B2* | 10/2023 | Padmanabhan | H04L 67/306 |
| | | | 707/703 |
| 2011/0246460 A1 | 10/2011 | Hsieh | |
| 2015/0213443 A1 | 7/2015 | Geffon | |
| 2016/0192165 A1 | 6/2016 | Agulnik | |
| 2016/0260169 A1 | 9/2016 | Arnold | |
| 2017/0214522 A1 | 7/2017 | Code | |
| 2017/0242887 A1 | 8/2017 | Zhao | |
| 2018/0005186 A1 | 1/2018 | Hunn | |
| 2018/0219836 A1 | 8/2018 | Peterson | |
| 2018/0374173 A1 | 12/2018 | Chen | |
| 2019/0057223 A1 | 2/2019 | Hanna | |
| 2019/0080406 A1 | 3/2019 | Molinari | |
| 2019/0146979 A1 | 5/2019 | Madisetti | |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan | |
| 2019/0238316 A1 | 8/2019 | Padmanabhan | |
| 2019/0238525 A1 | 8/2019 | Padmanabhan | |
| 2019/0244243 A1 | 8/2019 | Goldberg | |
| 2019/0303445 A1 | 10/2019 | Padmanabhan | |
| 2019/0333033 A1 | 10/2019 | Finlow-Bates | |
| 2019/0340623 A1 | 11/2019 | Rivkind | |
| 2019/0340689 A1 | 11/2019 | Gordon, III | |
| 2019/0377806 A1 | 12/2019 | Padmanabhan | |
| 2019/0385236 A1 | 12/2019 | McConnell | |
| 2020/0005284 A1 | 1/2020 | Madhu | |
| 2020/0036515 A1 | 1/2020 | Chari | |
| 2020/0042939 A1 | 2/2020 | Padmanabhan | |
| 2020/0074461 A1 | 3/2020 | Derosa-Grund | |
| 2020/0089663 A1 | 3/2020 | Padmanabhan | |
| 2020/0089670 A1 | 3/2020 | Padmanabhan | |
| 2020/0089671 A1 | 3/2020 | Padmanabhan | |
| 2020/0089672 A1 | 3/2020 | Velisetti | |
| 2020/0092362 A1 | 3/2020 | Balaji | |
| 2020/0112434 A1 | 4/2020 | Goodson | |
| 2020/0133955 A1 | 4/2020 | Padmanabhan | |
| 2020/0134656 A1 | 4/2020 | Padmanabhan | |
| 2020/0137082 A1 | 4/2020 | Jimenez-Delgado | |
| 2020/0159847 A1 | 5/2020 | Smith | |
| 2020/0184558 A1 | 6/2020 | Crumb | |
| 2020/0202038 A1 | 6/2020 | Zhang | |
| 2020/0204375 A1 | 6/2020 | Coulmeau | |
| 2020/0204557 A1 | 6/2020 | Singh | |
| 2020/0213127 A1 | 7/2020 | Maniyar | |
| 2020/0250174 A1 | 8/2020 | Padmanabhan | |
| 2020/0250176 A1 | 8/2020 | Padmanabhan | |
| 2020/0250177 A1 | 8/2020 | Padmanabhan | |
| 2020/0250295 A1 | 8/2020 | Padmanabhan | |
| 2020/0250661 A1 | 8/2020 | Padmanabhan | |
| 2020/0250683 A1 | 8/2020 | Padmanabhan | |
| 2020/0250747 A1 | 8/2020 | Padmanabhan | |
| 2020/0252205 A1* | 8/2020 | Padmanabhan | G06F 9/466 |
| 2020/0252404 A1 | 8/2020 | Padmanabhan | |
| 2020/0252406 A1 | 8/2020 | Padmanabhan | |
| 2020/0287718 A1 | 9/2020 | Hildebrand | |
| 2020/0287719 A1 | 9/2020 | Hildebrand | |
| 2020/0294165 A1 | 9/2020 | Yang | |
| 2020/0328899 A1 | 10/2020 | Glickshtein | |
| 2020/0334752 A1 | 10/2020 | Doney | |
| 2020/0349142 A1 | 11/2020 | Padmanabhan | |
| 2020/0349564 A1 | 11/2020 | Padmanabhan | |
| 2020/0371995 A1 | 11/2020 | Padmanabhan | |
| 2020/0374105 A1 | 11/2020 | Padmanabhan | |
| 2021/0042746 A1 | 2/2021 | Westland | |
| 2021/0117938 A1 | 4/2021 | Arora | |
| 2021/0133700 A1 | 5/2021 | Williams | |
| 2021/0150610 A1 | 5/2021 | Mao | |
| 2021/0150626 A1 | 5/2021 | Robotham | |
| 2021/0152536 A1 | 5/2021 | Padmanabhan | |
| 2021/0182272 A1 | 6/2021 | Shpurov | |
| 2021/0182423 A1* | 6/2021 | Padmanabhan | G06F 16/24573 |
| 2021/0182773 A1 | 6/2021 | Padmanabhan | |
| 2021/0182806 A1 | 6/2021 | Ornelas | |
| 2021/0226774 A1* | 7/2021 | Padmanabhan | G06F 9/466 |
| 2021/0240498 A1 | 8/2021 | Padmanabhan | |
| 2021/0243193 A1* | 8/2021 | Padmanabhan | G06F 16/252 |
| 2021/0248098 A1* | 8/2021 | Khandelwal | G06F 13/1605 |
| 2021/0342329 A1 | 11/2021 | Padmanabhan | |
| 2021/0357893 A1 | 11/2021 | Kang | |
| 2021/0373878 A1 | 12/2021 | Padmanabhan | |
| 2021/0374759 A1 | 12/2021 | Padmanabhan | |
| 2021/0377028 A1 | 12/2021 | Doney | |
| 2021/0382966 A1 | 12/2021 | Shii | |
| 2021/0385087 A1 | 12/2021 | Hildebrand | |
| 2021/0397604 A1 | 12/2021 | Padmanabhan | |
| 2022/0006705 A1 | 1/2022 | Padmanabhan | |
| 2022/0027356 A1 | 1/2022 | Padmanabhan | |
| 2022/0058633 A1 | 2/2022 | Yantis | |
| 2022/0101316 A1 | 3/2022 | Cramer | |
| 2022/0114238 A1 | 4/2022 | Padmanabhan | |
| 2022/0129475 A1 | 4/2022 | Thaw | |
| 2022/0147988 A1 | 5/2022 | Alexa | |
| 2022/0182446 A1* | 6/2022 | Sittisombut | H04L 67/1001 |
| 2022/0210061 A1 | 6/2022 | Simu | |
| 2022/0245560 A1 | 8/2022 | Dhaliwal | |
| 2022/0248165 A1 | 8/2022 | Dhaliwal | |
| 2022/0253836 A1 | 8/2022 | Russell | |
| 2022/0284008 A1 | 9/2022 | Treitlinger | |
| 2022/0300487 A1 | 9/2022 | Wright | |
| 2022/0300966 A1 | 9/2022 | Andon | |
| 2022/0351186 A1 | 11/2022 | Quigley | |
| 2022/0358462 A1 | 11/2022 | Oldfield | |
| 2022/0391889 A1* | 12/2022 | Holland | G06Q 20/3678 |
| 2022/0393873 A1* | 12/2022 | Holland | H04W 4/029 |
| 2022/0398538 A1 | 12/2022 | Jakobsson | |
| 2022/0414621 A1 | 12/2022 | Parlotto | |
| 2022/0414809 A1 | 12/2022 | Geng | |
| 2023/0004627 A1* | 1/2023 | Holland | G06F 21/105 |
| 2023/0081152 A1 | 3/2023 | Blazevige | |
| 2023/0123691 A1* | 4/2023 | Nunn | G06F 21/602 |
| | | | 713/153 |
| 2023/0126016 A1* | 4/2023 | Nelson | H04L 9/3213 |
| | | | 705/65 |
| 2023/0274270 A1* | 8/2023 | Bell | G06Q 20/3829 |
| | | | 705/75 |

FOREIGN PATENT DOCUMENTS

| | | |
|---|---|---|
| AU | 2019345041 A1 | 4/2021 |
| AU | 2020351764 A1 | 4/2022 |

(56) References Cited

FOREIGN PATENT DOCUMENTS

| | | |
|---|---|---|
| CN | 111902810 A | 11/2020 |
| CN | 111919417 A | 11/2020 |
| CN | 113039568 A | 6/2021 |
| CN | 113056760 A | 6/2021 |
| EP | 3747153 A1 | 12/2020 |
| EP | 3776255 A1 | 2/2021 |
| EP | 3853794 A1 | 7/2021 |
| JP | 2021512416 A | 5/2021 |
| WO | 2019152750 A1 | 8/2019 |
| WO | 2019190855 A1 | 10/2019 |
| WO | 2019241071 A1 | 12/2019 |
| WO | 2020061224 A1 | 3/2020 |
| WO | 2020061225 A1 | 3/2020 |
| WO | 2020061226 A1 | 3/2020 |
| WO | 2020092900 A2 | 5/2020 |
| WO | 2020160109 A1 | 8/2020 |
| WO | 2020234814 A1 | 11/2020 |
| WO | 2021116950 A1 | 6/2021 |

OTHER PUBLICATIONS

U.S. Appl. No. 16/294,646, Examiner Interview Summary dated Mar. 29, 2021, 3 pgs.
U.S. Appl. No. 16/294,646, Examiner Interview Summary dated May 28, 2021, 2 pgs.
U.S. Appl. No. 16/294,646, Examiner Interview Summary dated Jun. 30, 2021, 1 pg.
U.S. Appl. No. 16/294,646, Non-Final Office Action dated Feb. 22, 2021, 23 pgs.
U.S. Appl. No. 16/294,646, Notice of Allowance dated May 28, 2021, 13 pgs.
U.S. Appl. No. 16/294,654, Corrected Notice of Allowance dated Jun. 30, 2021, 10 pgs.
U.S. Appl. No. 16/294,654, Examiner Interview Summary dated Mar. 29, 2021, 2 pgs.
U.S. Appl. No. 16/294,654, Examiner Interview Summary dated Jun. 1, 2021, 1 pg.
U.S. Appl. No. 16/294,654, Examiner Interview Summary dated Jun. 30, 2021, 1 pg.
U.S. Appl. No. 16/294,654, Non-Final Office Action dated Feb. 22, 2021, 26 pgs.
U.S. Appl. No. 16/294,654, Notice of Allowance dated Jun. 1, 2021, 13 pgs.
Notice of Allowance dated May 11, 2023 for U.S. Appl. No. 17/648,865 (pp. 1-12).
Office Action (Final Rejection) dated Jun. 21, 2023 for U.S. Appl. No. 17/410,376 (pp. 1-30).
Office Action (Final Rejection) dated Jun. 22, 2023 for U.S. Appl. No. 17/410,366 (pp. 1-32).
Office Action (Non-Final Rejection) dated Mar. 2, 2023 for U.S. Appl. No. 17/410,376 (pp. 1-26).
Office Action (Non-Final Rejection) dated May 24, 2023 for U.S. Appl. No. 17/517,522 (pp. 1-13).
Office Action (Non-Final Rejection) dated May 31, 2023 for U.S. Appl. No. 17/412,059 (pp. 1-13).
Office Action (Non-Final Rejection) dated Jul. 11, 2023 for U.S. Appl. No. 17/412,056 (pp. 1-16).
Office Action (Non-Final Rejection) dated Jul. 26, 2023 for U.S. Appl. No. 17/517,543 (pp. 1-23).
Office Action (Notice of Allowance and Fees Due (PTOL-85)) dated Jul. 27, 2023 for U.S. Appl. No. 17/412,059 (pp. 1-8).
Office Action dated Mar. 6, 2023 for U.S. Appl. No. 17/517,541 (pp. 1-28).
Padmanabhan, Prithvi Krishnan et al., "Database System Public Trust Ledger Contract Linkage", U.S. Appl. No. 17/412,059, filed Aug. 25, 2021, 81 pages.
Padmanabhan, Prithvi Krishnan, "Database System Public Trust Ledger Architecture", U.S. Appl. No. 17/410,366, filed Aug. 24, 2021, 62 pages.
Padmanabhan, Prithvi Krishnan, "Database System Public Trust Ledger Architecture", U.S. Appl. No. 17/410,376, filed Aug. 24, 2021, 62 pages.
Padmanabhan, Prithvi Krishnan, "Database System Public Trust Ledger Contract Linkage", U.S. Appl. No. 17/412,056, filed Aug. 25, 2021, 81 pages.
Padmanabhan, Prithvi Krishnan, "Database System Public Trust Ledger Multi-Owner Token Architecture", U.S. Appl. No. 17/517,543, filed Nov. 2, 2021, 94 pages.
Padmanabhan, Prithvi Krishnan, "Database System Public Trust Ledger Token Creation and Exchange", U.S. Appl. No. 17/517,522, filed Nov. 2, 2021, 97 pages.
Padmanabhan, Prithvi Krishnan, "Database System Public Trust Token Redeem Architecture Using Wallets", U.S. Appl. No. 17/517,541, filed Nov. 2, 2021, 96 pages.

* cited by examiner

Smart contract 500

Public Key 502

Private key 504

Transaction Interface 506

Owner ID 508

Smart Contract ID List 510

Smart Contract Metadata 520

Item Token 512

Token ID 514

Digital Asset ID 516

Token Type 518

Token Metadata 522

Figure 5

Public Trust Ledger Synthetic Party 1500

- Owner Party 1502
  - Database System Owner Account ID 1506
  - Public Trust Ledger Synthetic Party Keys 1508
  - Public Trust Ledger Owner ID 1522

- Subordinate Parties 1504
  - Database System Account ID A 1510
  - . . . .
  - Database System Account ID N 1512

- Public Trust Ledger Synthetic Party Permission Rules 1514
  - Rule 1 1516 . . . . Rule K 1518

- Smart Contract Template 1520

Figure 15

DISTRIBUTED METADATA DEFINITION AND STORAGE IN A DATABASE SYSTEM FOR PUBLIC TRUST LEDGER SMART CONTRACTS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to database systems and more specifically to interactions between database systems and public trust ledgers.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Another mechanism for storing information is a public trust ledger, such as a blockchain. A public trust ledger is a distributed repository in which transactions are recorded. Transactions can be monetary, such as recording a payment, or non-monetary, such as recording a transfer of ownership. A public trust ledger is a distributed repository that is publicly accessible and that is secured based on cryptographic protocols.

Cloud computing systems provide platforms for a variety of computing operations. However, a cloud computing environment is typically controlled by a service provider that supervises and governs the environment. A public trust ledger does not depend on a trusted party to manage it, but does not provide a platform for many of the types of operations performed within a cloud computing system. Accordingly, improved techniques for transaction management are desired.

BRIEF DESCRIPTION OF THE DRAWINGS

The included drawings are for illustrative purposes and serve only to provide examples of possible structures and operations for the disclosed inventive systems, apparatus, methods and computer program products for database system digital asset creation and transfer. These drawings in no way limit any changes in form and detail that may be made by one skilled in the art without departing from the spirit and scope of the disclosed implementations.

FIG. 5 illustrates an example of a smart contract, configured in accordance with one or more embodiments.

FIG. 15 illustrates a diagram of a public trust ledger synthetic party, configured in accordance with one or more embodiments.

DETAILED DESCRIPTION

Figure 1:
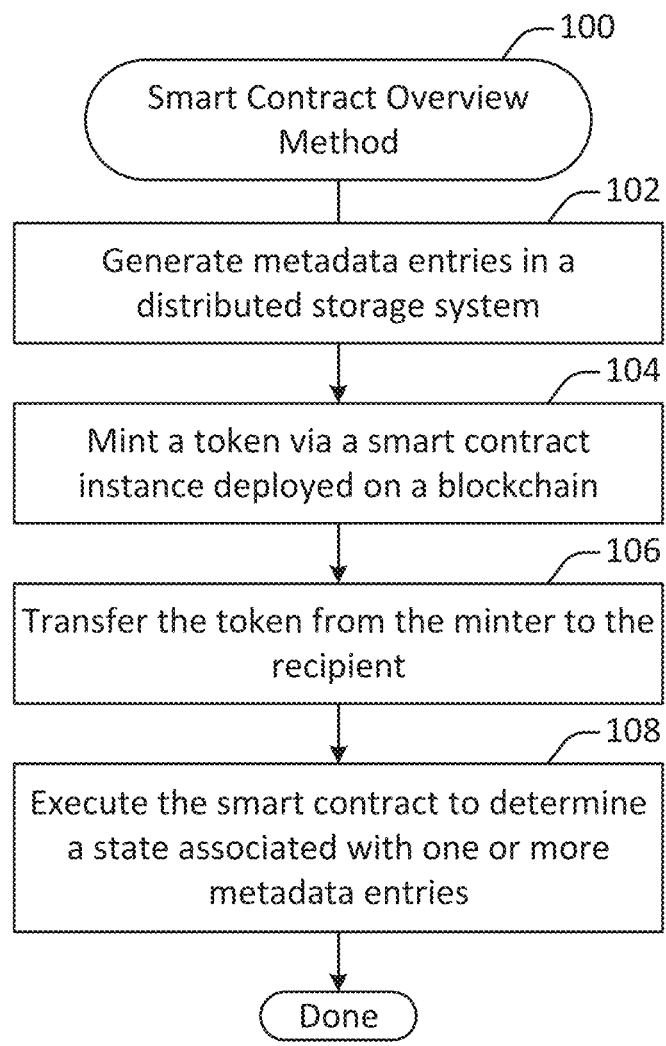
FIG. 1 illustrates an example of a smart contract overview method, performed in accordance with one or more embodiments.

Techniques and mechanisms described herein relate to interactions between an on-demand database system and a public trust ledger such as a blockchain. Metadata entries may be generated in a distributed storage system, and a token may be minted via a smart contract instance deployed on a blockchain. Then, the smart contract may be executed to determine a state associated with one or more of the metadata entries. In this way, the values of attributes associated with the token may be realized after the token is minted, for instance after it has been transferred from the original party that minted the token to a recipient.

An on-demand database system allows entities to store information such as records of transactions. However, in conventional systems, an on-demand database system is typically controlled by a service provider, requiring parties to a transaction recorded in the on-demand database system to trust that the service provider will continue to exist, will maintain an adequate level of security, will not permit the transaction record to be lost or corrupted, and will generally behave in a trustworthy manner.

Techniques and mechanisms described herein provide for interactions between an on-demand database system and a public trust ledger. A public trust ledger provides a way to record transactions in a manner that is secure, publicly verifiable, and free from control of any one entity. For instance, the database system may interact with the public trust ledger to record transactions related to the creation and transfer of ownership and other rights in digital assets referenced within the on-demand database system. The public trust ledger may then serve as a source of truth that it is independent of the service provider. A trust ledger may be variously referred to herein as a public trust ledger or a distributed trust ledger.

According to various embodiments, techniques and mechanisms described herein may facilitate the creation of non-fungible tokens. For instance, an entity accessing services via the on-demand computing services environment can easily and dynamically create any number of non-fungible tokens corresponding with digital assets such as avatars, apparel, characters, promotional material, or any other digital item.

Consider the example of Alexandra, an asset manager for a company "Acme" accessing computing services via the on-demand database system. Acme would like to create a set of non-fungible tokens to distribute to its customers as part of a promotional event. Different tokens may share attributes (e.g., color) but assume different values for the attributes (e.g., red, green, blue). Acme would like to reveal the attributes to the recipients of the token only after the tokens have been transferred. However, when using conventional techniques, attribute values for non-fungible tokens are fixed at the time of minting and therefore publicly observable to recipients even before the tokens are transferred.

In contrast, using techniques and mechanisms described herein, Alexandra may store metadata attributes in a distributed storage system, and mint tokens that do not include realized values for the tokens' attributes. Then, after a token has been minted and transferred to a recipient, the smart contract may be executed to associate the token with one or more of the metadata attributes. In this way, the true content of the token is revealed post-transfer via an update procedure rather than at the time of minting, providing greater flexibility in generating and managing digital assets.

According to various embodiments, techniques and mechanisms described herein may provide technical solutions that facilitate a variety of new ways for organizations to interact with customers. For example, an organization may employ branded collectibles represented by digital assets, facilitating expanded community engagement. As another example, an organization may bundle real world and digital experience linked to digital assets. As yet another example, an organization may securely send exclusive codes for benefits such as early access, discounts, VIP tickets, and gift cards. As still another example, an organization may build a loyal base of customers with free or gamified rewards across different use cases.

According to various embodiments, techniques and mechanisms described herein may facilitate the integration of blockchain data with database system data such as customer relations management (CRM) data and analytics. For instance, information stored in a database system, such as CRM data, may be linked with publicly verified information stored in a block chain to provide a combination of control, security, and verifiability. Such linkages may help to support, for instance, partnerships between organizations such as cross-brand partnerships and promotions.

According to various embodiments, techniques and mechanisms described herein may provide for scalability. Conventional techniques for interacting with public trust ledgers do not support enterprise-level exchange of digital assets. However, techniques and mechanisms described herein provide technological solutions for scaling digital asset exchange to the enterprise level, ensuring that transactions can occur quickly and efficiently even at high transaction throughput levels.

According to various embodiments, techniques and mechanisms described herein provide for smart contract generation and management. In addition to supporting simple tokens, various embodiments can support modeling complex asset classes. For example, smart contracts may include rules governing transactional aspects such as the number of transactions, type of transactions, and identities of parties.

According to various embodiments, techniques and mechanisms described herein provide technological solutions for facilitating interactions between database systems and public trust ledgers such as blockchain. For example, based on these techniques and mechanisms a blockchain may be used to store verification information, while other types of data may be stored in the database system. Such configurations can provide enhanced speed, reduced transaction costs, and improved data security as compared with conventional techniques. For instance, transactions may be publicly verified while at the same time storing data in a way that is consistent with privacy regulations.

According to various embodiments, techniques and mechanisms described herein may provide for enhanced transaction fee management techniques. When using conventional techniques, transaction fees may fluctuate based on the state of the public trust ledger. However, in some implementations described herein, a party may pay a fixed transaction fee to the database system. The fee may be determined based on, for instance, an asset type, a party type, or other such information. The database system may then communicate with the public trust ledger to record the transaction.

In particular embodiments, the database system service provider may employ a technology such as the Layer 2 protocol to facilitate interactions with a public trust ledger. In such an approach, the service provider may perform operations such as validation and minting within its own blockchain. Then, transactions may be recorded in a widely available public blockchain such as Ethereum. Such an approach may provide the benefits of publicly recording transactions as well as reducing transaction costs, since more costly transactions may be performed within the database service provider's blockchain, while employing the widely available public blockchain for less costly recordation operations.

As used herein, the terms "database" and "public trust ledger" are distinct. For example, a database system is controlled by a particular database administrator or service provider, whereas a public trust ledger is a peer-to-peer system in which transactions are publicly recorded in a manner that is outside the control of any one particular organization.

FIG. 1 illustrates an example of a smart contract representation overview method 100, performed in accordance with one or more embodiments. The method 100 may be used by an on-demand database system to generate non-fungible tokens having characteristics that are updated only after minting, and potentially after being transferred from the minting party to a recipient.

According to various embodiments, the method 100 may be implemented at a computing device within an on-demand database system. For instance, the method 100 may be implemented at one or more computing devices within the systems shown in FIG. 16, FIG. 17A, FIG. 17B, and FIG. 18.

One or more metadata entries are generated in a distributed storage system at 102. According to various embodiments, the one or more metadata entries may be generated at random, for instance by determining at random various combinations of possible attribute values for a set of attributes. Alternatively, or additionally, some of the metadata entries may be selected for generation, for example by the owner of a smart contract used to generate tokens relying on the generated metadata entries. Additionally details regarding the generation of metadata entries in a distributed storage system are discussed in additional detail with respect to the method 1900 shown in FIG. 19.

A token is minted via a smart contract instance deployed on a blockchain at 104. The token is then transferred from the minter to the recipient at 106. In some implementations, the token need not be transferred from the minter to the recipient in order to perform operation 108. However, transferring the token from the minter to the recipient allows the token to be updated not only after it has been minted, but also after it has changed ownership. Additional details regarding token minting and transfer are discussed with respect to the method 2000 shown in FIG. 20.

The smart contract is executed at 108 to determine a state associated with one or more of the metadata entries. According to various embodiments, the execution of the smart contract may update a metadata entry associated with the token to reference one or more of the metadata entries. In this way, the actual values of some or all of the attributes of the token may be stored in the distributed storage system and revealed only after the token has been minted and transferred to a recipient. Additional details regarding smart contract execution are discussed with respect to the method 2200 shown in FIG. 22.

Figure 2:
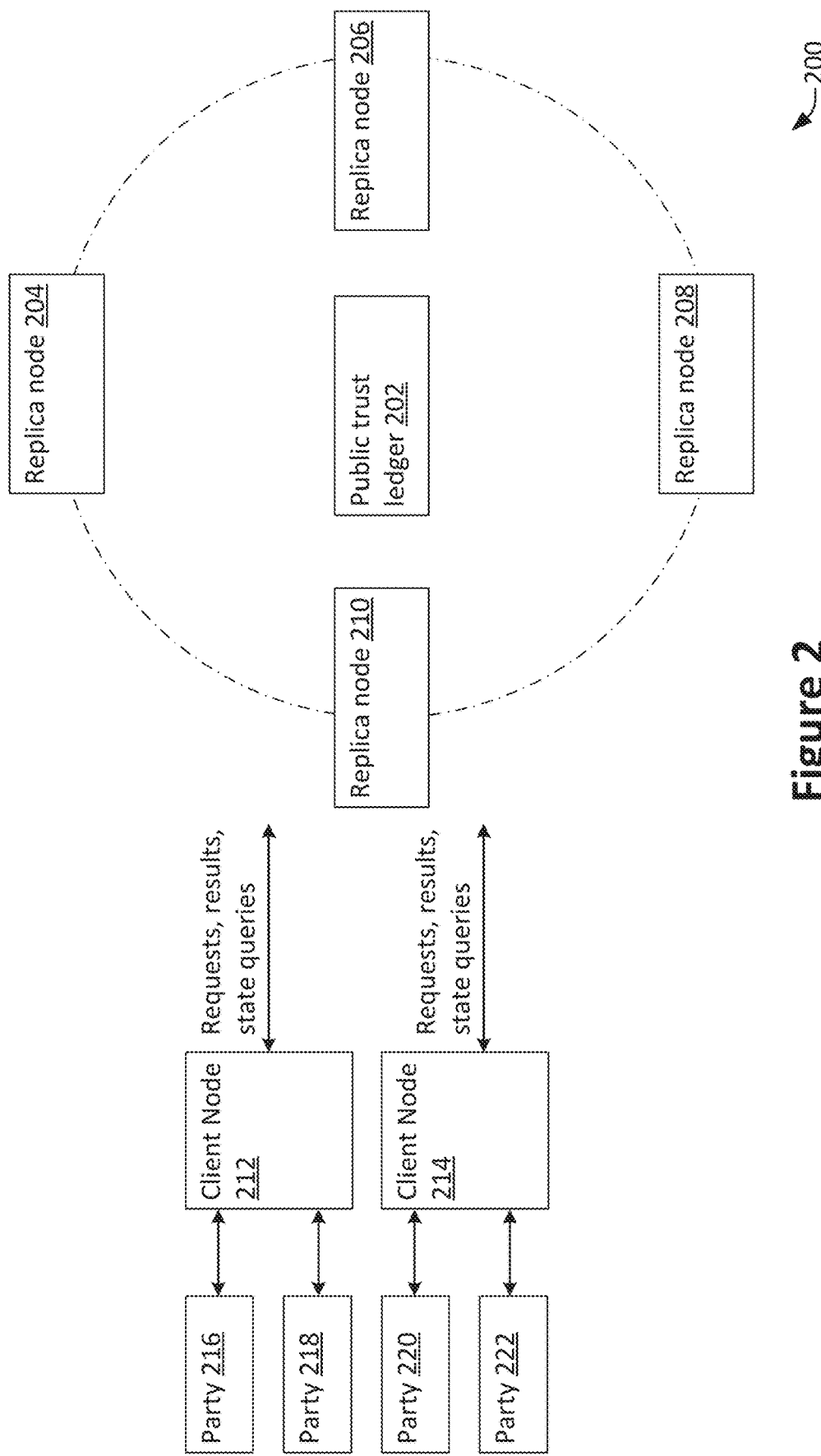
FIG. 2 illustrates an ecosystem facilitating interactions between a database system and a public trust ledger, configured in accordance with one or more embodiments.

FIG. 2 illustrates an ecosystem 200 facilitating interactions between a database system and a public trust ledger, configured in accordance with one or more embodiments. The ecosystem 200 may be used to implement techniques described herein, and may be implemented using one or more devices and systems shown in FIG. 16, FIG. 17A, FIG. 17B, and FIG. 18.

The ecosystem 200 includes a public trust ledger 202. According to various embodiments, the public trust ledger 202 may store information related to digital assets and transactions pertaining to digital assets. The public trust ledger 202 may be cryptographically verifiable. For example, the public trust ledger may employ one or more cryptographic technologies to provide a transparent, immutable, and cryptographically-verifiable log of transactions stored in the database.

In some implementations, the public trust ledger 202 may be configured so as to provide a single, consistent state at any time, allowing requests to continue to be processed despite failures or attacks. Requests to update the global state of the public trust ledger 202 may be implemented in a consistent manner. Such requests may be globally ordered via consensus between nodes.

Replica nodes are shown at 204, 206, 208, and 210. According to various embodiments, each replica node may be implemented via VMware. However, other types of node management tools may be used instead of, or in addition to, VMware. A replica node may process requests to verify or change the state of the public trust ledger 202.

According to various embodiments, the replica nodes may provide Byzantine fault tolerance (BFT). In a Byzantine fault, a component such as a server can inconsistently appear both failed and functioning to failure-detection systems, presenting different symptoms to different observers. It is difficult for the other components to declare it failed and shut it out of the network, because they need to first reach a consensus regarding which component has failed in the first place. However, the ecosystem 200 may use techniques such as the BFT State Machine Replication protocol and Merkle Tree data structures to ensure that the Replica and Client nodes' data are identical and to therefore provide tolerance against such faults.

According to various embodiments, interactions with the replica nodes may be conducted via client nodes, such as the client nodes 212 and 214. Each of the client and replica nodes may implement an application procedure interface (API) such as a Digital Asset Modeling Language ("DAML") ledger API server. According to various embodiments, DAML is an open-source smart contract language that aids in modeling agreements and runs on blockchain platforms. DAML Ledgers enable multi-party workflows by providing parties with a virtual shared ledger, which encodes the current state of their shared contracts, written in DAML.

In some implementations, a client node may communicate with one or more parties 216, 218, 220, 222 via a network such as the internet. According to various embodiments, a party may be a computing device on which an account in the public trust ledger has been authenticated, communicating via a secured session. For example, a party may submit a request to a client node, in accordance with methods described herein. The client node may send requests to one or more of the replica nodes and receive the results of running the requests. A client node may include a privacy-filtered subset of the state of the public trust ledger.

Figure 3:
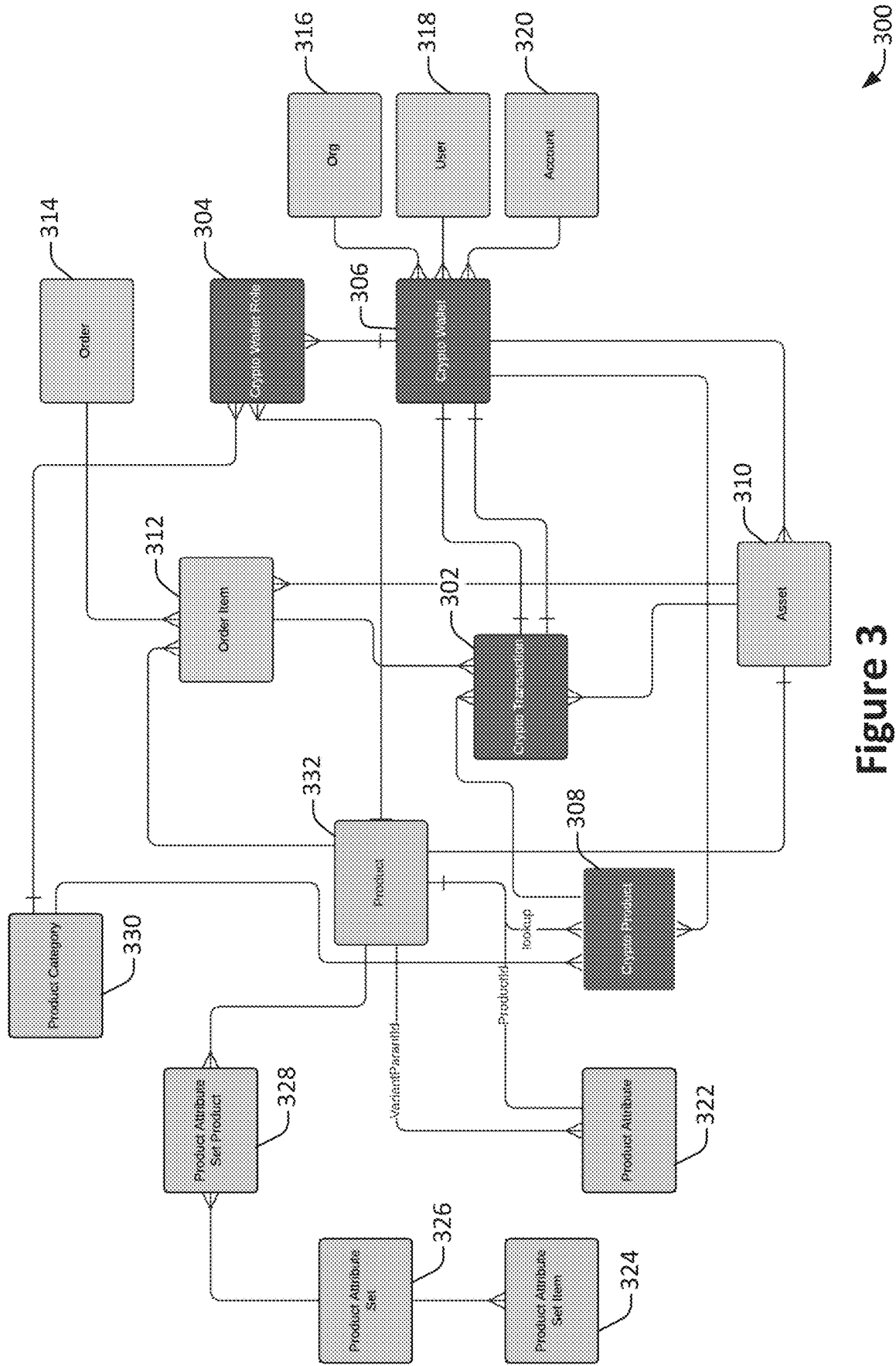
FIG. 3 illustrates an example of an arrangement of elements in a database system, configured in accordance with one or more embodiments.

FIG. 3 illustrates an example of an arrangement of elements in a database system 300, configured in accordance with one or more embodiments. The database system 300 includes entities representing crypto transactions 302, crypto wallet roles 304, crypto wallets 306, crypto products 308, assets 310, order items 312, orders 314, orgs 316, users 318, accounts 320, product attributes 322, product attribute set items 324, product attribute sets 326, product attribute set products 328, product categories 330, and products 332.

In some implementations, different entities may be stored in different database tables. Alternatively, two or more entities may be stored in the same database table, for instance in a dynamic schema database in which the contents of particular fields in a database table row depend on the entity type stored in that row.

According to various embodiments, the wallet table 306 may include entries that uniquely identify wallets in a public trust ledger. For example, an entry in the wallet table 360 may include a wallet ID associated with the database system and/or an account ID associated with an account in a public trust ledger such as a blockchain. Such an entry may also include one or more identifiers associated with an org 316, a user 318, and/or an account 320. An org 316 may represent a database system account associated with an entity to which the database system provides on-demand computing services. A user 318 may represent a user account associated with an individual authorized to perform one or more operations with respect to the database system on behalf of an org. An account 320 may represent another organizational or individual entity, for instance one who receives a digital asset created in association with an org 316.

According to various embodiments, the crypto wallet role table 304 may indicate one or more roles assigned to an org 316, user 318, or account 320. Such roles may include, but are not limited to: full or partial owner, buyer, issuer, royalty receiver, and modifier. In some configurations, a role may be specific to a particular product and/or product category.

According to various embodiments, the product table 332 includes entries that identify the products to which the digital assets relate. An entry in the product table 332 may include a product ID that uniquely identifies the product. The product category 330 may indicate a product record type such as an NFT, a branded token, a cryptocurrency, or any other suitable product type. Attributes of products may be represented in one or more of the product attribute set product table 328, the product attribute set table 326, and the product attribute set item table 324.

According to various embodiments, the crypto product table 308 includes content information associated with a digital asset. An entry in the crypto product table 308 may include a content ID that identifies the content and/or a product ID 312 identifying a product to which the digital asset relates. In some implementations, the entry may also include or reference digital content. The digital content may include, for example, media data associated with a product. Such media data may include, but is not limited to: one or more videos, animations, images, documents, or audio segments. In some configurations, the digital content data may be stored within the crypto product table 308. Alternatively, or additionally, digital content data may be stored in a different location and a reference to that location or data stored within the crypto product table 308.

According to various embodiments, the asset table 310 may store information about digital assets associated with tokens. For example, a digital asset may be a fungible token such as cryptocurrency or rewards program points. As another example, a digital asset may be ownership of, copyright to, or some other right related to an NFT. Various types of digital assets are possible, and a single product may be associated with more than one digital asset.

According to various embodiments, an entry in the asset table 310 may include a digital asset ID 310 that uniquely identifies the digital asset. An entry may also include a digital asset record type that identifies the type of digital asset. For instance, the digital asset record type may be an NFT, branded token, cryptocurrency, or any other suitable digital asset type.

According to various embodiments, the crypto transactions table 302 may store information related to transactions involving the assets identified in the asset table 310 and/or the crypto products identified in the crypto product table 308. Accordingly, an entry in the crypto transactions table 302 may include a transaction ID that uniquely identifies the transaction and a digital asset ID to which the transaction pertains. A single digital asset ID may be associated with more than one transaction. A transaction may be included within an order item 312, which may in turn be included within an order 314. In some implementations, an entry in the asset transaction table 350 may include a transaction status field storing information such as whether the transaction is pending, canceled, or complete.

The configuration of tables shown in FIG. 3 is only one example of a database system configuration that may be used in conjunction with techniques and mechanisms described herein. According to various embodiments, any of a variety of database system configurations may be used. For example, two or more of the tables shown in FIG. 3 may instead be implemented in a single table. As another example, information shown in FIG. 3 as being stored in a single table may instead be stored in more than one table. As yet another example, tables shown in FIG. 3 may include other information not represented in FIG. 3.

In the database representation shown in FIG. 3, a split connection indicates a potentially one-to-many relationship. For example, an order 314 may include more than one order item 312. However, the types of relationships and connections between entities shown in FIG. 3 represent only one possible arrangement of data entities within a database system. In practice, a wide variety of configurations may be used in keeping with techniques and mechanisms described herein.

In some implementations, the database system 300 may be implemented as a multitenant database. Alternatively, a different type of database architecture may be employed.

According to various embodiments, the database system 300 may include many components other than those shown in FIG. 3. Examples of the types of components that may be included in a database system are discussed with respect to FIG. 16, FIG. 17A, FIG. 17B, and FIG. 18.

Figure 4:
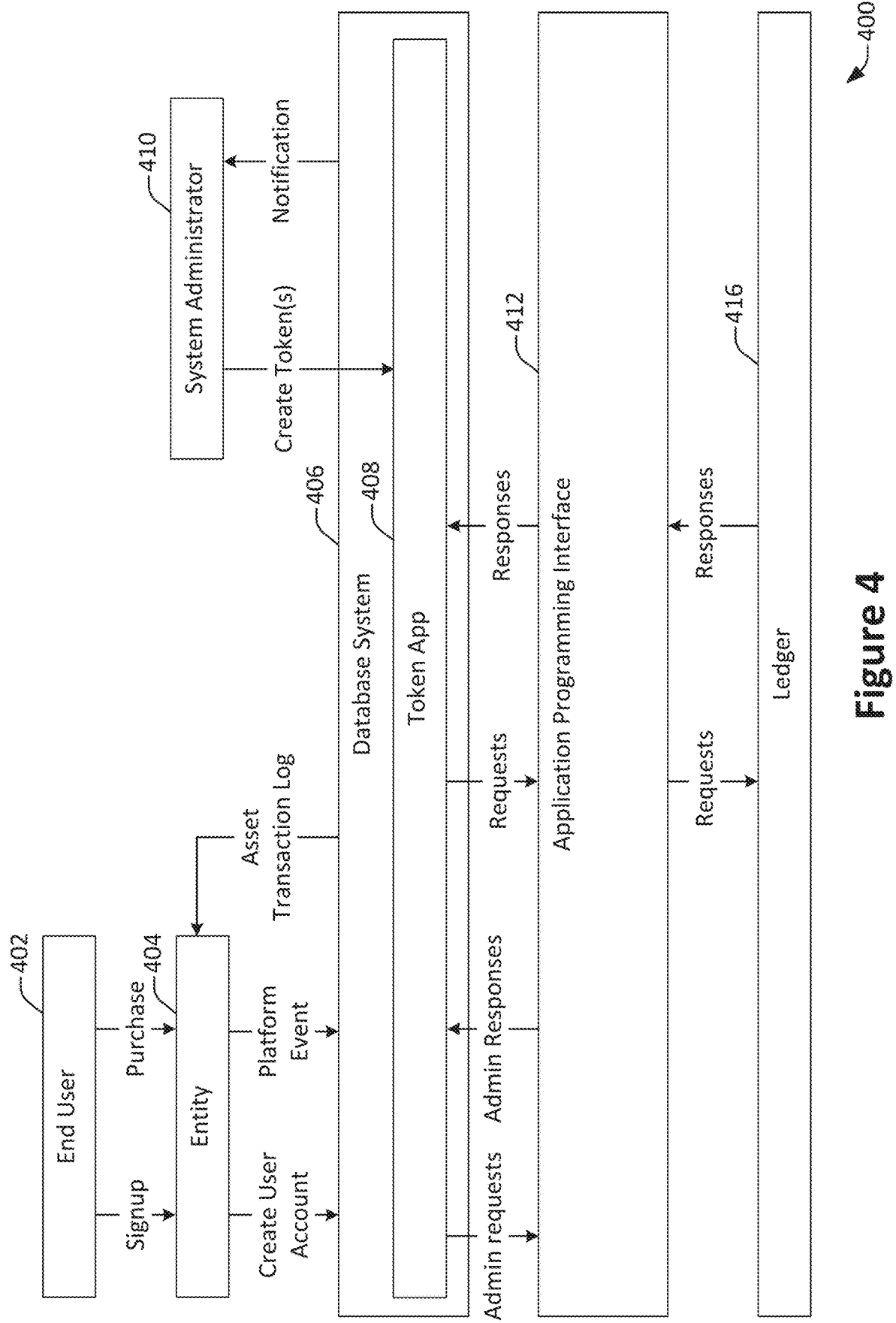
FIG. 4 illustrates an architecture diagram of a system facilitating interactions between a database system and a public trust ledger, configured in accordance with one or more embodiments.

FIG. 4 illustrates an architecture diagram of a system 400 facilitating interactions between a database system and a public trust ledger, configured in accordance with one or more embodiments. The system 400 includes an end user 402, an entity 404, a database system 406, a token app 408, a system administrator 410, an API 412, and a ledger 416. FIG. 4 illustrates, at a high level, some of the interactions between such components, interactions which are explored in additional detail throughout the application.

According to various embodiments, the end user 402 may be a computing device associated with a user interacting with the entity 404. For example, the end user 402 may sign up to establish a public trust ledger account for accessing digital assets and may purchase, or be awarded, such assets. As used herein, the term "purchase" may refer to a transaction in which a digital asset is acquired in exchange for currency. However, the term "purchase" may also refer to other types of transactions, such as when a user is awarded a digital asset as an incentive or reward.

According to various embodiments, the entity 404 may be an organization accessing computer services provided by the database system 406. For example, the entity 404 may be a business accessing customer relations management services, data storage services, or any other computing services via the database system 406.

According to various embodiments, the database system 406 may be configured to provide various services to a variety of entities via the internet. Such services may include, but are not limited to CRM services, sales management services, account service management services, social media services, and training services. Examples of components included in a database system are discussed in additional detail throughout the application, for example with respect to the FIG. 16, FIG. 17A, FIG. 17B, and FIG. 18.

According to various embodiments, the database system 406 may include a token app 408 for performing operations related to digital assets. The entity 404 may communicate with the database system 406 to perform operations such as creating an account for the end user 402, request to transfer a digital asset to the user's account, and/or receive information relating to such transactions.

According to various embodiments, the system administrator 410 may be a computing device authenticated to an individual configured to perform administrative operations on behalf of the entity 404. For example, the system administrator 410 may perform operations such as creating digital assets and associated tokens and/or receiving notifications related to digital assets.

According to various embodiments, the ledger API 412 may provide a point of contact for interacting with the public trust ledger. For example, the token app 408 may send and receive administrative communications with the API 412. Such communications may include, for instance, various configuration operations.

The API 412 may include a DAML API. According to various embodiments, the DAML API may be configured to communicate directly with the public trust ledger, for instance in a custodial wallet configuration. For instance, the DAML API may be configured to perform operations such as specifying transactions for recording in the ledger 416.

In some implementations, the API 412 may be an interface associated with a non-custodial wallet. For example, a Metamask wallet may be connected with the database system. The database system may then communicate with the Metamask wallet to perform one or more blockchain-related applications. For instance, the database system may send a blockchain-related instruction to the Metamask wallet, where the wallet owner may sign the instruction with a private key to perform an action on the blockchain.

In some implementations, communication with the public trust ledger 416 through the API may be role-specific. For instance, a smart contract may be associated with various roles, such as minter, royalty recipient, administrator, smart contract owner, token owner, and the like. Accordingly, the database system 406, the API 412, and/or the blockchain 416 may validate requests to determine whether a requester is associated with a role that allows the requester to perform the requested action. Additional details regarding roles are described with respect to the diagram 1500 shown in FIG. 15.

In some implementations, communication with the public trust ledger 416 through the API 412 may include a blockchain parameter. For instance, the database system 406 may support interaction with more than one blockchain. In such a situation, the API 412 may be used to communicate with more than one blockchain, and a parameter value may identify the blockchain that is the subject of a particular communication interaction. The API 412 may communicate with the database system 406 to tailor operations for a particular blockchain. For instance, the system may select a particular smart contract byte code implementation depending on the blockchain parameter.

FIG. 5 illustrates an example of a smart contract 500, configured in accordance with one or more embodiments. According to various embodiments, the smart contract 500 may be used to record transactions related to digital assets in a public trust ledger. The smart contract 500 includes a public key 502, a private key 504, a transaction interface 506, an owner ID 508, a smart contract ID list 510, one or more item tokens 512, and smart contract metadata 520.

In some implementations, the smart contract 500 is a computer program that may be included within a public trust ledger such as a blockchain. The smart contract 500 may then be executed to perform one or more operations, accessible via the transaction interface 506. Such transactions may include, but are not limited to: transferring ownership of one or more item tokens 512, providing one or more entries on the smart contract id list 510, and identifying the owner 508.

According to various embodiments, a smart contract may be implemented as a template and one or more instances of the template. For example, a template may be created for a particular type of token. Then, an instance of the smart contract template may be used to store some quantity of the token. For example, an instance of a smart contract may store one or more NFTs of a particular type and owned by a particular account. As another example, an instance of a smart contract template may store a quantity of a fungible token of a particular type and owned by a particular account. An instance of a smart contract template may be identified by, for example, an execution ID.

According to various embodiments, communication with the smart contract 500 may be secured via the public key 502 and the private key 504. The public key 502 is publicly available to anyone with access to the public trust ledger, while the private key 504 is private to the smart contract 502. Any system may employ the public key 502 to encrypt a message that can only be decrypted by the smart contract's private key. Similarly, the smart contrast 500 may encrypt a message using the private key 504. Although anyone may decrypt the message using the public key 502, the recipient of the message may verify that the message was sent by the smart contract 500 by virtue of its being decryptable using the smart contract's public key 502.

In some configurations, the public key 502 and the private key 504 may be used to encrypt some or all of the communication with the smart contract 500. Alternatively, or additionally, the public key 502 and the private key 504 may be used to facilitate a key exchange for the purpose of establishing a secure communication session between the smart contract 500 and another party to the communication session.

According to various embodiments, the owner ID 508 identifies the owner of the smart contract 500 and the included one or more tokens 512. The owner ID 508 may indicate an account in the public trust ledger. By authenticating as the owner associated with the owner ID 508, the owner may be able to authorize one or more transactions associated with the smart contract 500, such recording a transaction transferring the token 512 to a different party.

In some implementations, the smart contract ID list 510 may identify one or more other smart contracts associated with the smart contract 500. For example, the smart contract ID list 510 may identify one or more other smart contracts that are chained with the smart contract 500. In some configurations, one or more of the smart contracts identified by the smart contract ID list 510 may need to be executed in order for the smart contract 500 to be executed.

In some embodiments, the item token 512 identifies the digital asset being transferred. The token 512 includes a token ID 514, a digital asset ID 516, a token type 518, and token metadata 522. The digital asset ID 516 is an identifier that identifies a digital asset recorded in a database system. For instance, the digital asset ID 516 may correspond with a value in column 314 for an entry in the digital asset table 310.

According to various embodiments, the token ID 514 is an identifier created when the token 512 is minted. The token ID 514 uniquely identifies the token 512 within the public trust ledger. The token type 518 indicates the type of token represented by the token 512. For example, the token type 518 may indicate ownership of the digital asset ID 516. As another example, the token type 518 may indicate ownership of one or more rights associated with the digital asset ID 516. Examples of such rights may include, but are not limited to: some or all of the copyrights associated with the digital asset identified by the digital asset ID 516, the right to transfer the digital asset identified by digital asset ID 516, or the right to transfer rights associated with the digital asset identified by digital asset ID 516.

In some implementations, a smart contract 500 may include a single token 512. Alternatively, a smart contract 500 may include more than one token. For example, the ERC-1155 standard as well as other types of token standards provide for multiple tokens within the same smart contract 500.

In some embodiments, the token 512 may be non-fungible. However, as discussed herein, techniques and mechanisms described herein may also be used in conjunction with fungible tokens.

According to various embodiments, the smart contract metadata 520 may include information stored within the smart contract that may be used for various purposes. For example, the smart contract metadata may include information used to determine whether a requested transfer is permissible. For instance, the smart contract metadata may include information such as the number of times a token may be transferred, the identities of one or more parties to whom the token may or may not be transferred, or other such constraints. Such information may be specified in any suitable format, such as JSON or XML.

According to various embodiments, the token metadata may include one or more attributes of a token minted by the smart contract. For instance, in the case of an NFT, the token metadata may identify unique characteristics of the NFT. In some configurations, token metadata may include a reference to information stored outside the blockchain. For example, the token metadata may include a URI or other identifier associated with information stored in the InterPlanetary File System (IPFS), Filecoin, or other distributed storage system. As another example, the token metadata may include a URI or other identifier associated with information stored elsewhere in the same or a different blockchain. As another example, the token metadata may include a URI or other identifier associated with information stored in a different location, such as YouTube.

Figure 6:
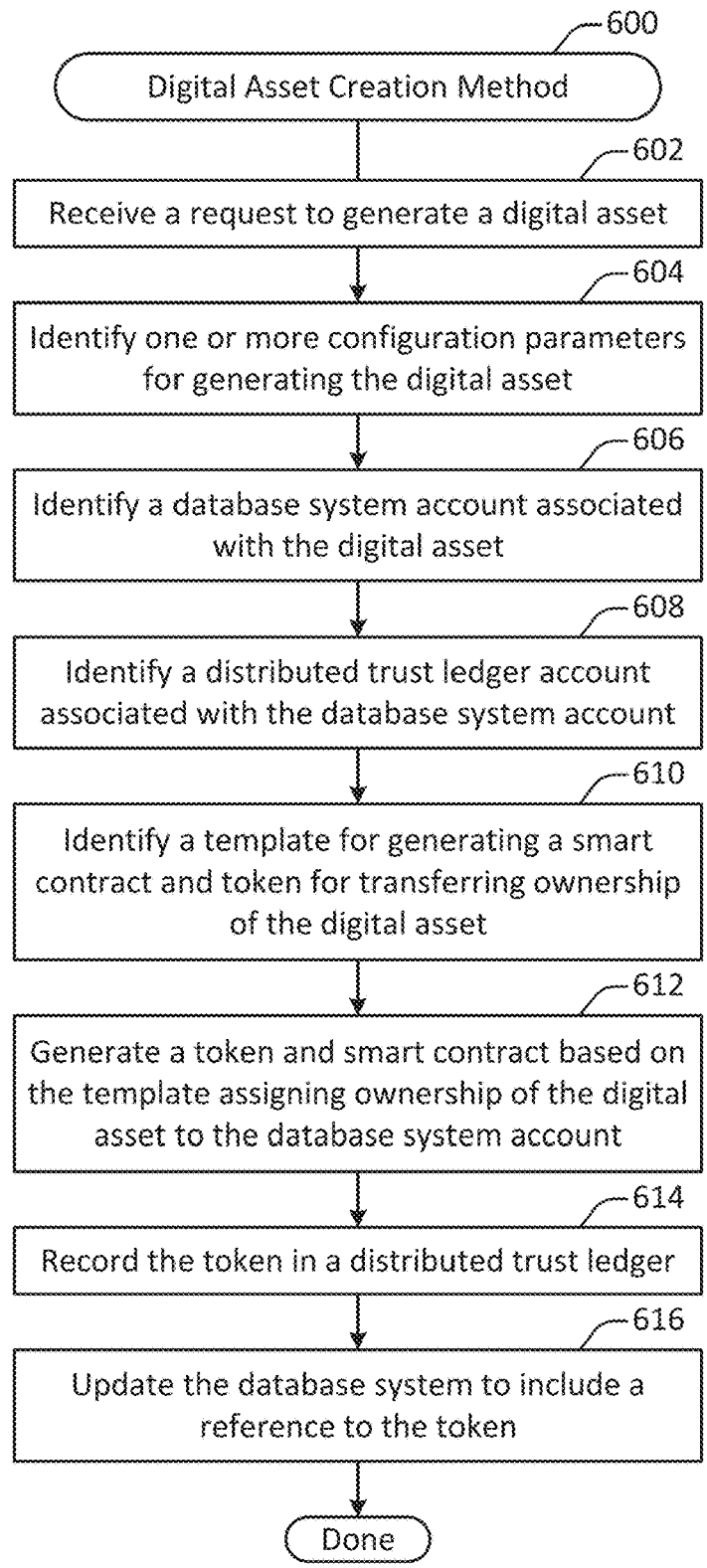
FIG. 6 illustrates an example of a method for creating a digital asset, performed in accordance with one or more embodiments.

FIG. 6 illustrates an example of a method 600 for creating a digital asset, performed in accordance with one or more embodiments. According to various embodiments, the method 600 may be performed at one or more computing devices within an on-demand computing services environment. The method 600 may be performed in order to create a digital asset and one or more associated tokens with one or more corresponding smart contracts.

A request to generate a digital asset is received at 602. According to various embodiments, the request may be received within the on-demand computing services environment. For example, an asset manager may provide user input requesting that the digital asset be generated. As another example, a digital asset may be generated automatically, for instance based on an automated script that is executed at a designated time or upon detection of a triggering condition. For instance, when a reference to a physical asset is added to the database system, a configuration parameter may indicate that a corresponding digital asset should be created as well.

One or more configuration parameters for generating the digital asset are identified at 604. In some implementations, a configuration parameter may be specified via user input. Alternatively, or additionally, a configuration parameter may be determined automatically, for instance based on a predetermined configuration file or a default configuration value.

According to various embodiments, various types of configuration parameters may be employed. Some parameters may relate to one or more rights that may be conferred by ownership of a digital token. Such parameters may include, but are not limited to: one or more rights to a digital asset, whether a right may be transferred, the number of times a right may be transferred, whether rights are separable or must be transferred together, and whether ownership may be fractional. Some parameters may relate to the nature of one or more tokens. Such parameters may include, but are not limited to: the quantity of tokens created, media content such as images, videos, sounds, or animations for creating the tokens, and/or one or more templates for smart contract and/or token creation.

In particular embodiments, the one or more configuration parameters may include metadata for generating the digital asset. For example, a product object as stored in the database system may be extensible in that in can include additional metadata. That metadata may include, for example, structured and/or unstructured data or rules, which may be used to generate token metadata for storing in the public trust ledger. That token metadata may be used in a variety of ways, such as for validating a transfer request against one or more transfer rules.

In particular embodiments, metadata may be stored in the public trust ledger in a privacy-sensitive manner. For example, personally identifying information such as a social security number, email address, or other such data may be hashed, and the resulting hash values stored in the public trust ledger. In this way, ownership of a token in the public trust ledger may be tied not only to a database account identifier, but also to personally identifying information. For instance, a verification process may involve hashing a known element of personally identifier information and ensuring that the resulting hash value matches information stored in the trust ledger. However, the personally identifying information need not be stored in the trust ledger in a cleartext state and therefore need not be publicly and permanently revealed.

A database system account associated with the digital asset is identified at 606. In some embodiments, the database system account may be identified based on the request received at 602. For instance, the request may be received from a computing device having authenticated in association with the database system account.

In some implementations, the database system account may correspond to an individual. Alternatively, the database system account may correspond to a different type of entity, such as an organization.

In particular embodiments, the database system may be a multitenant database configured to store information associated with multiple entities, or tenants, in the same database table. In such a configuration, the database system account may correspond to one of the tenants.

A public trust ledger account associated with the database system account is identified at 608. According to various embodiments, the public trust ledger account may be identified by consulting a correspondence table within the database system that links database system accounts with public trust ledger accounts. An example of such a table is shown in FIG. 3.

A template for generating a smart contract and token for transferring ownership of the digital asset is identified at 610. In some implementations, the template may identify attributes of the smart contract and/or token such as one or more of the parameters identified at 604.

A token assigning ownership of the digital asset to the database system account is generated based on the template at 612. According to various embodiments, generating the token may involve operations such as identifying attributes other than those specified in the template. For instance, a set of NFTs may be generated for various color combinations of a digital asset, such as an item of digital apparel that is usable in conjunction with a digital avatar. In such a situation, attributes specific to the NFT may be combined with the template identified at 610 and the distributed trust ledger account 608 to generate the NFT.

The smart contract and token are recorded in a public trust ledger at 614. In some implementations, the smart contract and token may be recorded by executing a token minting process. The token minting process may involve executing a smart contract on a public blockchain, such as the Ethereum blockchain. However, techniques and mechanisms described herein are not limited to Ethereum, and instead are applicable to any blockchain or other public trust ledger that supports smart contracts. The minting process may involve one or more operations such as confirming the token as an asset on the blockchain, updating the account balance of the blockchain account identified at 326 to include the minted token, adding one or more transactions confirming such information to a block, and confirming the block to others within the blockchain network. The smart contract may be executed in part based on computations performed by one or more blockchain miners.

In particular embodiments, such as when the token is a fungible token, recording the token in a distributed trust ledger may involve registering the token in an exchange as exchangeable. Fungible tokens may include, but are not limited to, branded tokens, cryptocurrency, loyalty points, or other such interchangeable assets.

According to various embodiments, fungible and non-fungible tokens may vary in any of several ways. For example, non-fungible token may be required to possess one or more unique attributes. As another example, fungible tokens may be configured so as to be subdividable.

The database system is updated to include the reference to the token at 616. According to various embodiments, updating the database system may include generating or updating a database entry to include one or more identifiers associated with the token. For instance, a token ID, a token smart contract ID, a digital trust ledger account ID, and/or any other relevant information may be added to the database system. Additional details regarding the types of information that may be stored are described with respect to FIG. 3.

According to various embodiments, the method 600 may be performed in order to generate more than one digital asset. For instance, a set of digital assets may be generated for virtual clothing to be worn by digital avatars. In such a situation, a digital asset may be generated for each of a variety of combinations of clothing colors.

Figure 7:
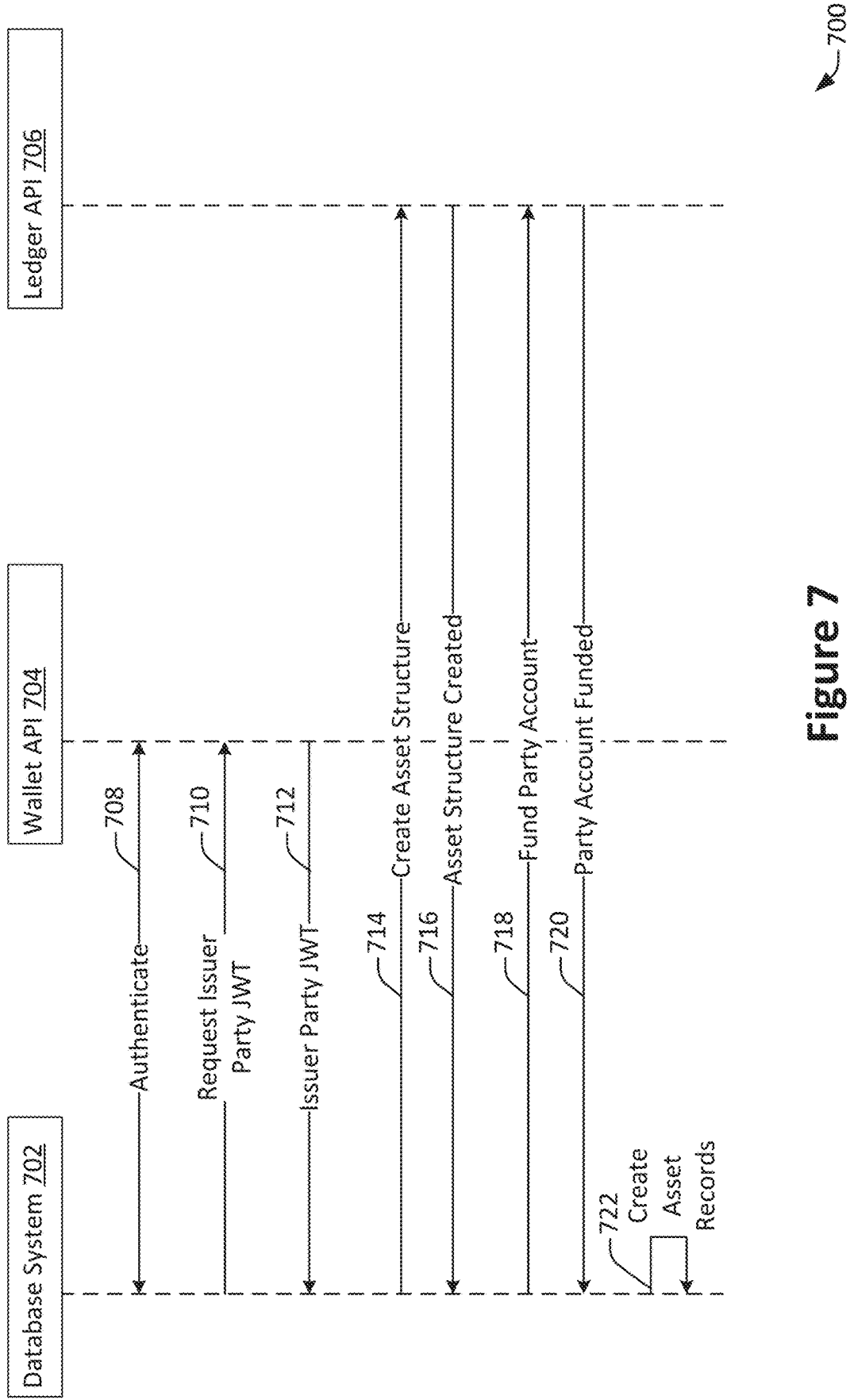
FIG. 7 illustrates an example of a procedure for minting a token, performed in accordance with one or more embodiments.

FIG. 7 illustrates an example of a procedure 700 for minting a token, performed in accordance with one or more embodiments. According to various embodiments, the token minting procedure may involve interactions between the database system 702, the wallet API 704, and the ledger API 706.

At 708, upon receiving a request to mint a token, the database system may authenticate the party associated with the request to the wallet API 704. For instance, the database system may verify to the wallet API that the database system includes has access to authentication credentials associated with the request issuer.

An issuer party JSON web token (JWT) is requested at 710 and returned at 712. According to various embodiments, a JWT is a token that facilitates the creation of data. A JWT payload may include JSON that asserts some number of claims. A JWT may be signed an/or encrypted. When a request is made by the database system to mint a token, receiving a JWT from the wallet API 704 allows the database system 702 to interacting with the ledger API 706 to mint the token on behalf of the wallet API 704. That is, the database system 702 may use the JWT to effectively authenticate as a particular wallet to the ledger API 706. It should be noted that a JWT is only one example of the way in which such authentication may occur.

A request to create an asset structure for the token is sent to the ledger API 706 at 714, and a response message is returned at 716. According to various embodiments, the request sent at 714 may define one or more characteristics of the token, for instance as discussed with respect to the method 600 shown in FIG. 6.

A request to fund a party account is sent to the ledger API 706 at 718, and a response message is returned at 720 indicating that the party account has been funded. According to various embodiments, the request sent at 718 may be used to assign the asset to the wallet identified by the issuer party JWT returned at 712.

At 722, one or more records of the asset or assets are created in the database system. For example, one or more records discussed with respect to the database system 300 shown in FIG. 3 may be created.

Figure 8:
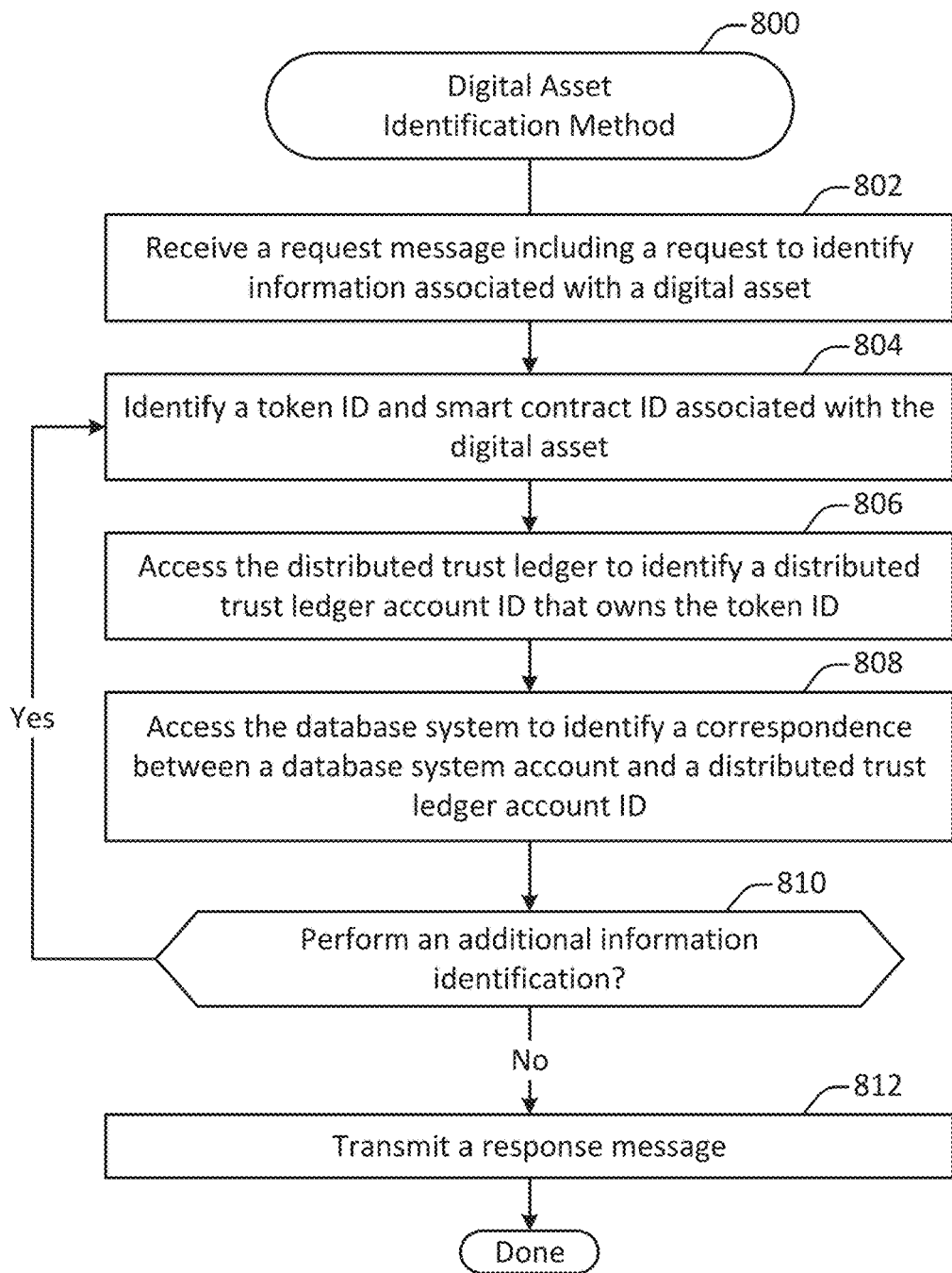
FIG. 8 illustrates an example of a method for identifying one or more parties associated with a digital asset, performed in accordance with one or more embodiments.

FIG. 8 illustrates an example of a method 800 for identifying information associated with a digital asset, performed in accordance with one or more embodiments. In some implementations, the method 800 may be performed at an on-demand database system. Alternatively, or additionally, the method 800 may be performed at a system configured to analyze a public trust ledger.

A request message including a request to identify information associated with a digital asset is received at 802. According to various embodiments, the method 800 may be used to identify any of various types of information, such as a current or previous owner of an NFT associated with a digital asset or a digital asset own by a particular party.

According to various embodiments, the request may include any of various request parameters used to query digital asset information. For example, the request may include a token identifier associated with a digital asset. As another example, the request may include a trust ledger account ID that may own a digital asset. As another example, the request may include a database system account ID that may own a digital asset. As yet another example, the request may include a smart contract ID that may include a token for a digital asset. Various types of queries are possible. As still another example, the request may include a digital asset identifier associated with the database system.

A token ID and smart contract ID associated with the digital asset are identified at 804. According to various embodiments, such information may be identified in any of various ways. For example, such information may be included with the request received at 802. As another example, such information may be determined or verified by accessing the database system. For instance, one or more of the tables shown in FIG. 3 may be queried using information included in the request. As yet another example, such information may be determined or verified by analyzing the public trust ledger.

The public trust ledger is accessed at 806 to identify a public trust ledger account ID that owns the token ID. In some implementations, information from the public trust ledger may be accessed by syncing some or all of the distributed public trust ledger with a local machine. Alternatively, or additionally, a trusted platform that provides access to the public trust ledger may be queried to access the information.

The database system is accessed at 808 to identify a correspondence between a database system account and a public trust ledger ID. According to various embodiments, accessing the database system may involve querying the table 330 shown in FIG. 3. For example, a database account ID may be used to identify a corresponding trust ledger account ID. As another example, a trust ledger account ID may be used to identify a corresponding database account ID.

According to various embodiments, when an identifier is identified, additional information may be identified as well. For instance, information about an database system account or public trust ledger account, such as the account name or other contact information, may be returned.

A determination is made at 810 as to whether to perform additional information verification. In some implementations, the determination may be made at least in part on the nature of the query. For instance, a query may indicate a request to identify all owners of rights that pertain to a particular digital asset. Alternatively, or additionally, the determination made at 810 may be made at least in part based on user input. For instance, a user may provide a request to identify additional information pertaining to a different or related right or digital asset.

According to various embodiments, queries may be linked in various ways. For example, to identify a copyright holder associated with a digital asset, the system may first identify a token and associated token owner for the digital asset. That information may then be used to identify a related NFT associated with copyright for the digital asset.

A response message is transmitted at 812. According to various embodiments, the response message may include any or all of the information discussed with respect to FIG. 8, and/or any other suitable information.

According to various embodiments, the operations shown in FIG. 8 may be performed in an order different than that shown. For example, an identification process may start with a database account ID and then identify information such as one or more tokens and corresponding digital assets owned by a public trust ledger account associated with that database account ID. As another example, an identification process may start with a public trust ledger ID and then identify information such as a database account ID corresponding with the public trust ledger ID. Various types and combinations of queries are possible.

Figure 9:
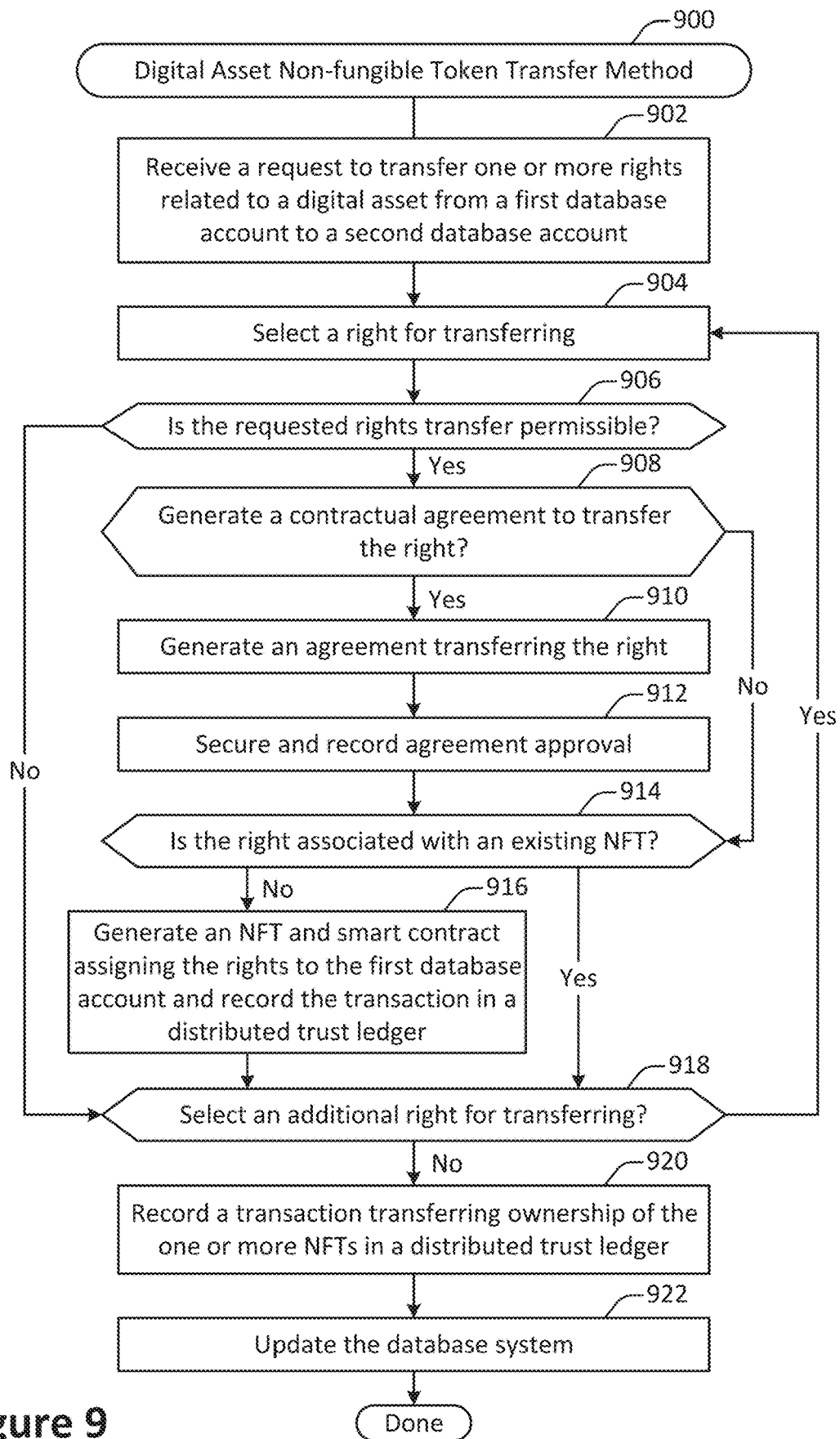
FIG. 9 illustrates an example of a method for transferring a digital asset non-fungible token, performed in accordance with one or more embodiments.

FIG. 9 illustrates an example of a method 900 for transferring a digital asset, performed in accordance with one or more embodiments. The method 900 may be performed at one or more computing systems within an on-demand database system. The method 900 may be used to transfer one or more NFTs providing ownership of a digital asset and/or other rights related to the digital asset from a first party to a second party.

A request is received at 902 to transfer a one or more rights for a digital asset from a first database account to a second database account. In some implementations, the request may be generated based on user input. For instance, a user associated with one database account may generate a request to transfer a right to a second database account. In some embodiments, the request may be generated automatically. For instance, the request may be generated when the database system detects that a transaction related to a digital asset has occurred.

A right is selected for transferring at 904. In some implementations, the right selected for transferring may be identified in the request received at 902. Alternatively, or additionally, one or more rights may be selected by a user, for instance by providing input via a user interface.

According to various embodiments, a digital asset transfer method may be used to transfer multiple NFTs associated with a digital asset. For example, a database account may transfer a first NFT providing ownership rights to the digital asset, a second NFT providing a limited copyright over the digital asset, and a third NFT providing a right to modify the digital asset. Alternatively, or additionally, a digital asset transfer method may be used to transfer an NFT providing rights over a digital asset without transferring ownership of the digital asset. For example, a database account may transfer a right to modify a digital asset without transferring ownership of the digital asset.

A determination is made at 906 as to whether the requested rights transfer is permissible. According to various embodiments, the determination made at 906 may involve determining whether rights associated with the digital asset are owned by the first database account. In some embodiments, one or more rights may be associated with the first database account by default. For instance, if the digital asset was created by the holder of the first database account, then that party may be assumed to hold copyright, transfer rights, and other such rights associated with the digital assets.

In some implementations, one or more rights may be associated with the first database account by virtue of the first database account owning an NFT associated with the rights. The ownership status of an NFT associated with the right may be verified in one or more of various ways. For example, the database system may record the current owner of the NFT, as discussed with respect to the database system 300 configured as shown in FIG. 3. As another example, the ownership of the NFT may be validated by consulting the public trust ledger. An example of a method for verifying NFT ownership by interacting with a public trust ledger is shown in the method 800 in FIG. 8.

In some implementations, the determination made at 906 may involve evaluating one or more validation rules determined based on metadata stored within the smart contract. For example, the smart contract may include a rule prohibiting the token from being transferred more than a designated number of times. As another example, the smart contract may include a rule prohibiting the token from being transferred to a particular entity.

A determination is made at 908 as to whether to generate a contractual agreement to transfer the right. According to various embodiments, the determination may be made at least in part based on the right being transferred. For example, ownership rights may not need a contractual agreement to facilitate a transfer, while a contractual agreement may be needed to transfer a copyright. As another example, a right may be transferrable without a signed contractual agreement in one jurisdiction, whereas a different jurisdiction may require a signed contractual agreement to effectuate a transfer. Such requirements may be stored as metadata within the database system and/or within the public trust ledger.

If a determination to generate a contractual agreement is made, then at 910 such an agreement may be generated. In some implementations, generating a contractual agreement may involve identifying a template associated with the type of rights being transferred and then completing that template with information associated with the specific transfer being effectuated. For instance, a template for transferring copyright over an item of digital apparel for an avatar may be filled out with information such as the identity of the party that currently owns the item, the identity of the party to whom the item is being transferred, and identifying information for the item being transferred.

Approval of the agreement is secured and recorded at 912. According to various embodiments, securing approval may be performed in any of various ways. For example, a party may sign an agreement using a digital signature mechanism. As another example, an agreement may be printed, physically signed by a representative of the party, and scanned. The particular method used to secure approval of the agreement may depend, for instance, on the type of rights being transferred and any specific requirements (e.g., jurisdictional requirements, requirements imposed by the parties, etc.) associated with the transfer of such rights.

In some implementations, approval may need to be secured from both parties. For instance, the transfer of ownership or copyright may involve securing approval from both the transferee and the transferor. Alternatively, approval may only need to be secured from one of the parties. For example, for some rights approval may need to be obtained only for the party transferring the right.

A determination is made at 914 as to whether the right is associated with an existing NFT. According to various embodiments, such a determination may be made by querying the database system 300 shown in FIG. 3.

If the right is not associated with an existing NFT, an NFT and associated smart contract assigning the rights to the first database account may be created and recorded in a public trust ledger at 916. The creation and recordation of such an NFT may be substantially similar to the operations 510-516 shown in FIG. 5.

In some implementations, more than one NFT may be created, for instance in the event that more than one right is selected for transfer. In such a situation, the creation and recordation of NFTs and smart contracts for the different rights may be performed as part of the same transaction.

A determination is made at 918 as to whether to select an additional right for transferring. According to various embodiments, additional rights may be selected until all rights identified for transferring are associated with a respective NFT and contractual agreements have been generated and approved wherever such agreements are indicated.

At 920, a transaction transferring ownership of the one or more NFTs is recorded in a public trust ledger. In some embodiments, multiple NFT transfers may be grouped into a single public trust ledger transaction. Alternatively, or additionally, an NFT transfer may be treated as a distinct transaction for recording within the public trust ledger.

The database system is updated at 922. According to various embodiments, updating the database system may involve storing an indication of the transactions recorded at operations 908 or 920. For instance, the database system 300 shown in FIG. 3 may be updated to indicate that the second party is now the owner and/or rights holder associated with the digital asset and that the first party is no longer the owner and/or rights holder.

In particular embodiments, NFT creation and/or transfer transactions may be combined in various ways. For example, the ERC-1155 standard allows for including multiple NFTs within the same smart contract. Such an approach may help to reduce the transaction costs associated with recording transactions in the public trust ledger.

Figure 10:
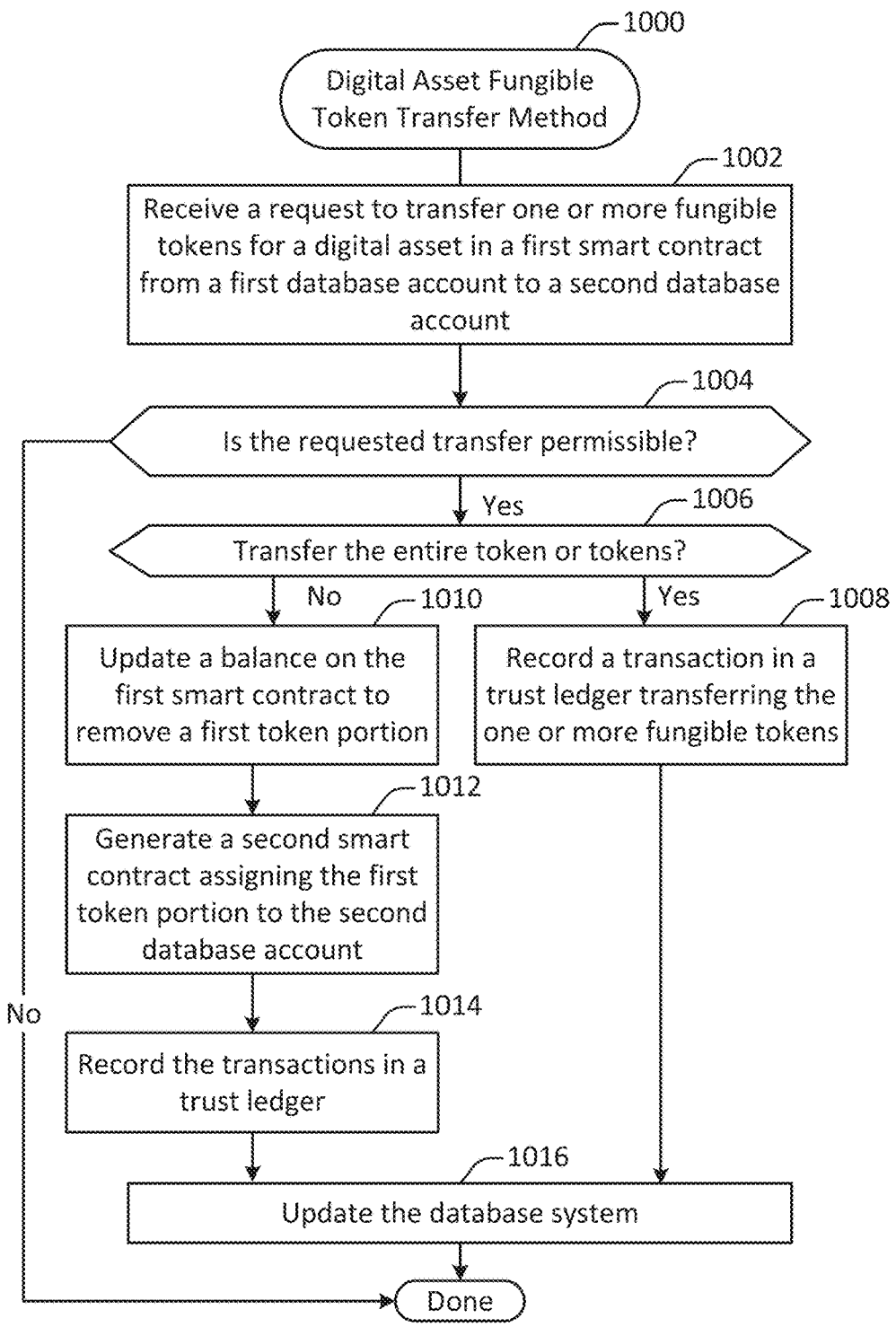
FIG. 10 illustrates an example of a method for transferring a digital asset fungible token, performed in accordance with one or more embodiments.

FIG. 10 illustrates an example of a method 1000 for transferring a digital asset fungible token, performed in accordance with one or more embodiments. The method 1000 may be performed at one or more computing systems within an on-demand database system. The method 1000 may be used to transfer one or more fungible token providing ownership of a digital asset and/or other rights related to the digital asset from a first party to a second party.

A request is received at 1002 to transfer a one or more fungible tokens for a digital asset from a first database account to a second database account. In some implementations, the request may be generated based on user input. For instance, a user associated with one database account may generate a request to transfer a right to a second database account. In some embodiments, the request may be generated automatically. For instance, the request may be generated when the database system detects that a transaction related to a digital asset has occurred.

A determination is made at 1004 as to whether the requested transfer is permissible. According to various embodiments, the determination made at 1004 may involve determining whether rights associated with the digital asset are owned by the first database account. In some embodiments, one or more rights may be associated with the first database account by default. For instance, if the digital asset was created by the holder of the first database account, then that party may be assumed to hold copyright, transfer rights, and other such rights associated with the digital assets.

In some implementations, one or more rights may be associated with the first database account by virtue of the first database account owning a token associated with the rights. The ownership status of a token associated with the right may be verified in one or more of various ways. For example, the database system may record the current owner of the token, as discussed with respect to the database system 300 configured as shown in FIG. 3. As another example, the ownership of the token may be validated by consulting the public trust ledger. An example of a method for verifying token ownership by interacting with a public trust ledger is shown in the method 800 in FIG. 8.

In some implementations, the determination made at 1004 may involve evaluating one or more validation rules determined based on metadata stored within the smart contract. For example, the smart contract may include a rule prohibiting the token from being transferred more than a designated number of times. As another example, the smart contract may include a rule prohibiting the token from being transferred to a particular entity.

A determination is made at 1006 as to whether to transfer the entire token or tokens. According to various embodiments, fungible tokens may be configured so as to be subdivided. For instance, a quantity of cryptocurrency, loyalty tokens, branded tokens, or other such tokens may be subdivided and transferred only in part to the second entity.

According to various embodiments, whether to subdivide the token or tokens, as well as the amount to transfer if subdivided, may be indicated in the request received at 1002. Alternatively, or additionally, user input indicating such information may be received. As still another possibility, such information may be determined automatically, for instance by matching the subdivided portion to a quantity need to complete a purchase.

When it is determined to transfer the entire token or quantity of tokens, then at 1008 a transaction transferring the one or more tokens is recorded in the trust ledger. According to various embodiments, the transaction may be recorded by executing the first smart contract.

If instead a determination is made to transfer only a portion of the tokens, then at 1010 a balance on the first smart contract may be updated to remove a first portion of the token or tokens. At 1012, a second smart contract may be generated that assigns the first token portion to the second database account. Then, the transactions are recorded in a trust ledger at 1014. According to various embodiments, the transaction may be recorded at least in part by executing the first smart contract.

The database system is updated at 1016. According to various embodiments, updating the database system may involve storing an indication of the transactions recorded at operations 1008 or 1014. For instance, the database system 300 shown in FIG. 3 may be updated to indicate that the second party is the owner of the token, tokens, or token portions that were transferred, and that the first party is no longer the owner of the token, tokens, or token portions.

In particular embodiments, token creation and/or transfer transactions may be combined in various ways. For example, the ERC-1155 standard allows for including multiple tokens within the same smart contract. Such an approach may help to reduce the transaction costs associated with recording transactions in the public trust ledger.

Figure 11:
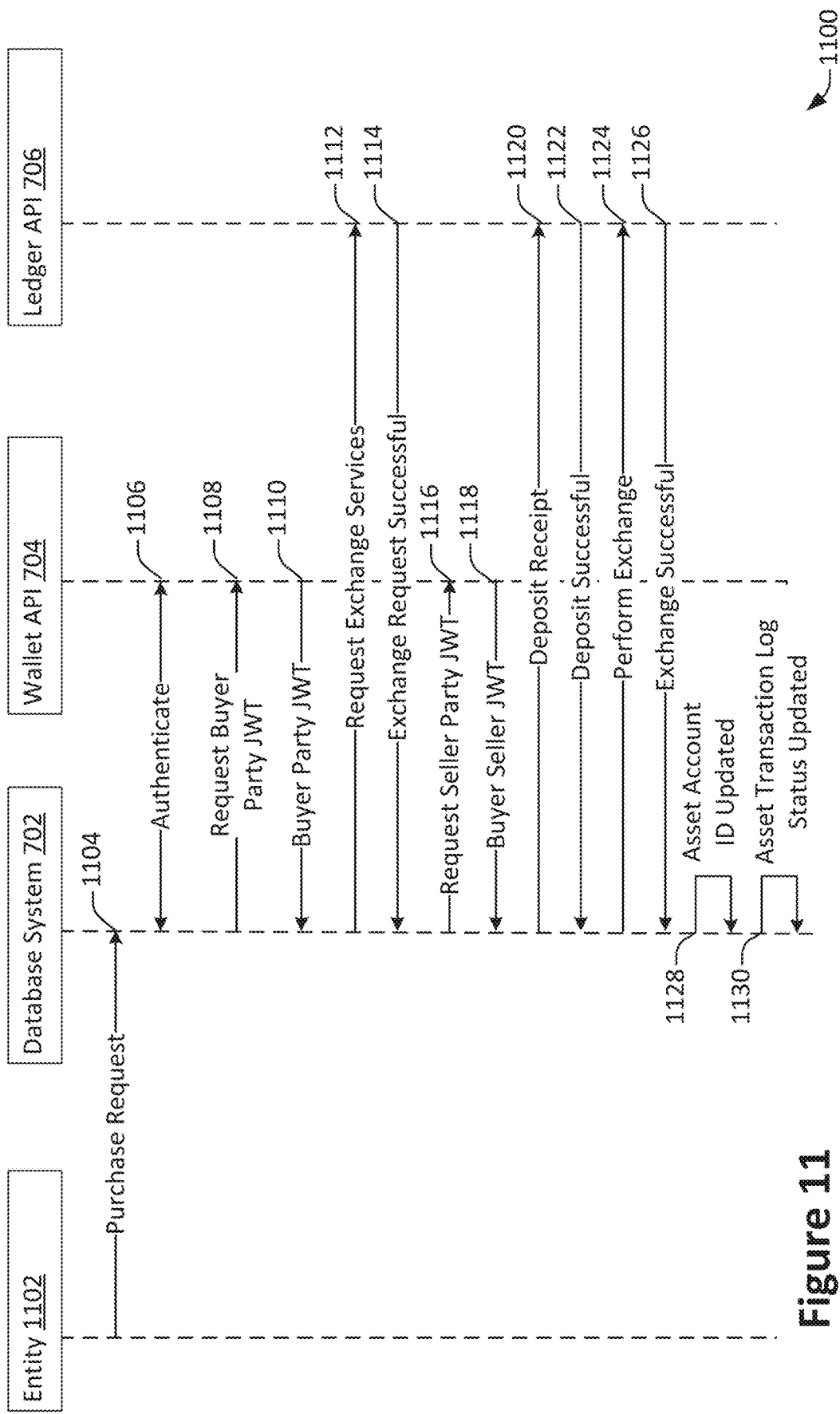
FIG. 11 illustrates an example of a messaging procedure for transferring a token, performed in accordance with one or more embodiments.

FIG. 11 illustrates a messaging procedure 1100 for transferring a token, performed in accordance with one or more embodiments. According to various embodiments, the messaging procedure 1100 may be used in conjunction with one or more techniques or mechanisms described herein, such as the methods 900 and 1000 shown in FIGS. 9 and 10.

A purchase request is sent from an entity 1102 at 1104. According to various embodiments, the entity 1102 may be any suitable entity within the database system. For example, the entity 1102 may be a computing device authenticated as a user or organization having a database system account. The purchase request may indicate one or more fungible and/or non-fungible tokens that the entity would like to purchase.

At 1106, upon receiving a request to purchase a token, the database system may authenticate the party associated with the request to the wallet API 704. For instance, the database system may verify to the wallet API that the database system includes has access to authentication credentials associated with the request issuer.

A buyer party JSON web token (JWT) is requested at 1108 and returned at 1110. According to various embodiments, when a request is made by the database system to purchase a token, receiving a JWT from the wallet API 704 allows the database system 702 to interacting with the ledger API 706 to transfer the token to the buyer's wallet. That is, the database system 702 may use the JWT to effectively authenticate as a particular wallet to the ledger API 706. It should be noted that a JWT is only one example of the way in which such authentication may occur.

Exchange services are requested at 1112 and confirmed at 1124. According to various embodiments, requesting exchange services may involve, for instance, initiating communication with the appropriate node. For example, the communication may involve establishing a communication with the node, verifying that the seller party is the owner of the token subject to the requested purchase, and/or verifying that the requested purchase is permissible.

A seller party JSON web token (JWT) is requested at 1116 and returned at 1118. According to various embodiments, when a request is made by the database system to purchase a token, receiving a JWT from the wallet API 704 allows the database system 702 to interacting with the ledger API 706 to transfer the token from the seller's wallet. That is, the database system 702 may use the JWT to effectively authenticate as a particular wallet to the ledger API 706. It should be noted that a JWT is only one example of the way in which such authentication may occur.

At 1120, the database system 702 requests to deposit the token from the seller's wallet. The deposit is confirmed at 1122. At 1124, the database 702 sends a request to perform the exchange. The exchange is confirmed at 1126. According to various embodiments, operations 1120 and 1122 may relate to, for example, the exchange of payment. The operations 1124 and 1126 may relate to the exchange of one or more tokens after payment is made and confirmed.

The asset account ID is updated in the database system at 1128. According to various embodiments, updating the asset account ID may involve updating a database entry associated with the digital asset to indicate that the purchaser is now the owner of the digital asset.

The asset transaction log status is updated at 1120. According to various embodiments, updating the asset transaction log status may involve creating or modifying an entry in the transaction table to indicate that the transaction has been completed.

A request to create an asset structure for the token is sent to the ledger API 706 at 714, and a response message is returned at 716. According to various embodiments, the request sent at 714 may define one or more characteristics of the token, for instance as discussed with respect to the method 600 shown in FIG. 6.

A request to fund a party account is sent to the ledger API 706 at 718, and a response message is returned at 720 indicating that the party account has been funded. According to various embodiments, the request sent at 718 may be used to assign the asset to the wallet identified by the issuer party JWT returned at 712.

At 722, one or more records of the asset or assets are created in the database system. For example, one or more records discussed with respect to the database system 300 shown in FIG. 3 may be created.

Figure 12:
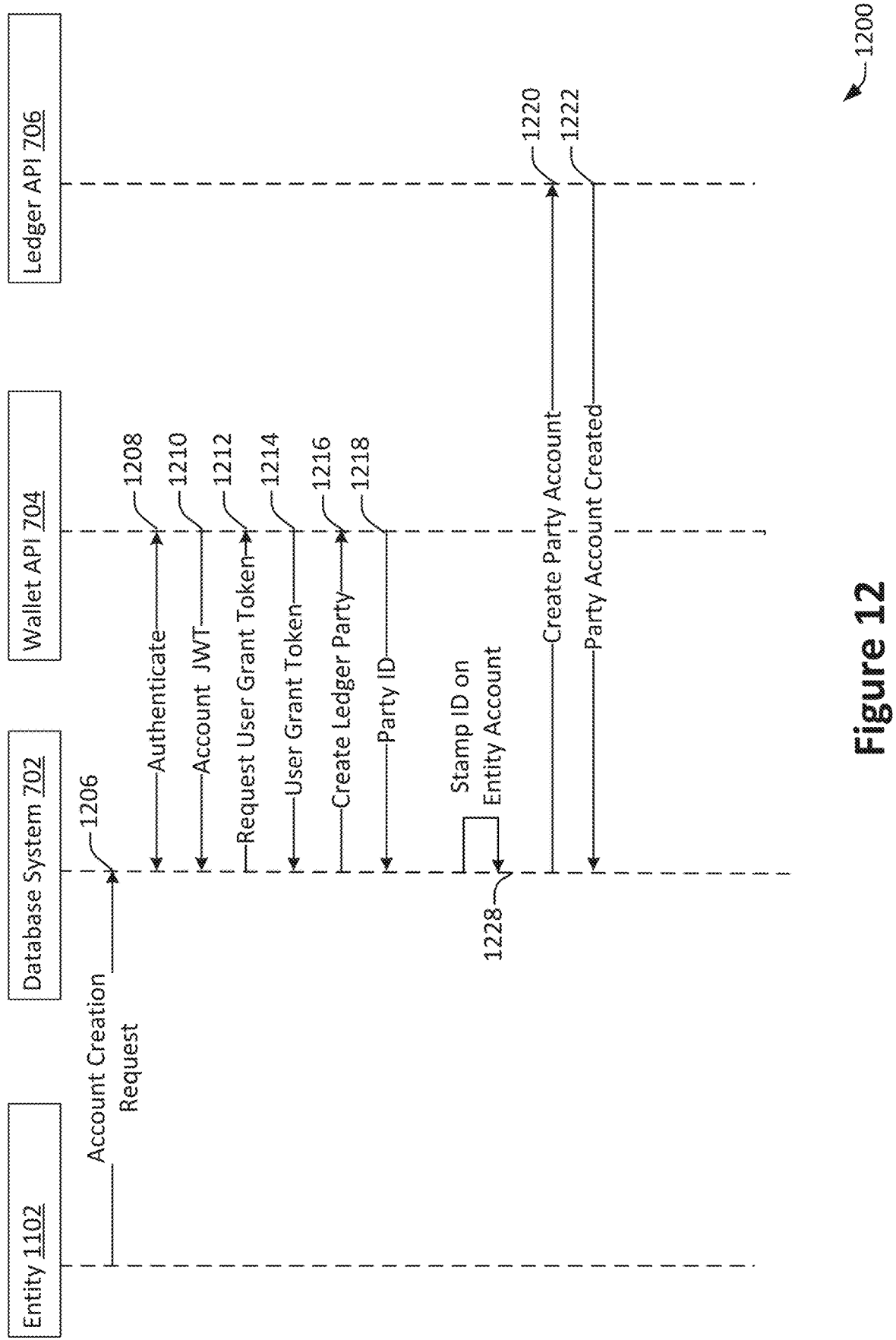
FIG. 12 illustrates an example of a messaging procedure for creating an account, performed in accordance with one or more embodiments.

FIG. 12 illustrates a messaging procedure 1200 for creating an account, performed in accordance with one or more embodiments. According to various embodiments, the messaging procedure 1200 may be used in conjunction with one or more techniques or mechanisms described herein, such as for example to create an account that may be used to issue or purchase tokens.

An account creation request is sent from an entity 1102 at 1206. According to various embodiments, the entity 1102 may be any suitable entity within the database system. For example, the entity 1102 may be a computing device authenticated as a user or organization having a database system account. The account creation request may include information identifying and authenticating the entity associated with the request.

At 1208, upon receiving a request to purchase a token, the database system may authenticate the party associated with the request to the wallet API 704. The wallet API 704 may respond by providing an account JWT at 1210, configured as discussed with respect to the methods 700 and 1100 shown in FIGS. 7 and 11.

A request user grant token is requested at 1212 and returned at 1214. According to various embodiments, the request user grant token may be used by the database system 702 to uniquely identify a new user being created. The new user may be associated with a new wallet created based on interacting with the wallet API 704, and the user's information recorded in the ledger API 706.

A request to create a party is sent to the wallet API at 1216, and the party's ID is returned at 1218. The party's ID is stamped on the entity's database system account at 1228. According to various embodiments, the party ID may uniquely identify the party in the distributed trust ledger.

At 1220, a request to record the creation of the party account in the public trust ledger is sent to the ledger API 706. A confirmation that the party account was recorded is returned at 1222.

Figure 13:
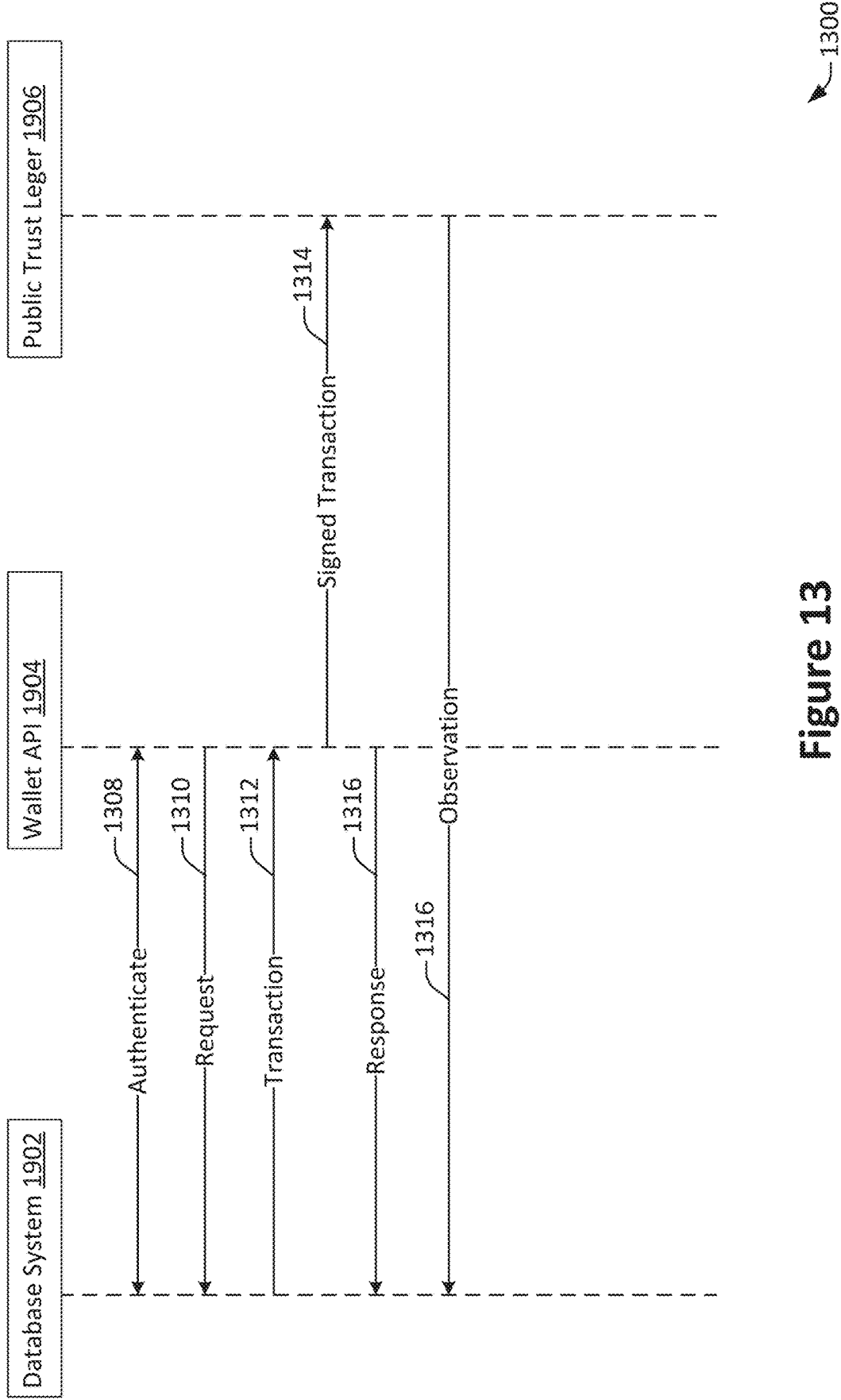
FIG. 13 illustrates an example of a procedure for communicating with a public trust ledger via a non-custodial wallet, performed in accordance with one or more embodiments.

FIG. 13 illustrates an example of a procedure 1300 for communicating with a public trust ledger via a non-custodial wallet, performed in accordance with one or more embodiments. According to various embodiments, various procedures discussed herein are described in the context of a custodial wallet configuration, in which the database system maintains credentials associated with a wallet. However, any of these procedures may be adapted to a non-custodial configuration, as discussed with respect to the procedure 1300 shown in FIG. 13.

An authentication process is performed at 1308. According to various embodiments, the authentication process may involve establishing a secure connection between the database system 1302 and a non-custodial wallet. The non-custodial wallet may be located, for instance, at a local or cloud computing location controlled by an organization or individual associated with a database system account. The authentication process may involve the owner of the database system account connecting the wallet to the database system as a decentralized application.

A request is transmitted from the wallet API 1304 (or the owner of the database system) to the database system 1302 at 1310. According to various embodiments, the request may be any request in the context of techniques and mechanisms described herein. For instance, the request may involve configurating a smart contract for deployment on the blockchain, or a request to mint a token for a smart contract deployed on the blockchain.

A blockchain transaction or other instruction is sent from the database system 1302 to the wallet API 1304 at 1312. According to various embodiments, the transaction may involve deploying a smart contract to the blockchain, minting a token, or some other blockchain-related action.

At 1314, the owner of the database system account signs the transaction and records it to the blockchain. At that point, the transaction is executed. For example, a smart contract may be deployed, a token may be minted, or a token may be transferred.

The owner of the database system account may send a response to the database system at 1316 indicating that the transaction has been recorded. Moreover, the database system may directly observe the blockchain at 1316. Collectively this information may be used to update one or more records at the database system to reflect transactions that have occurred in the blockchain.

Figure 14:
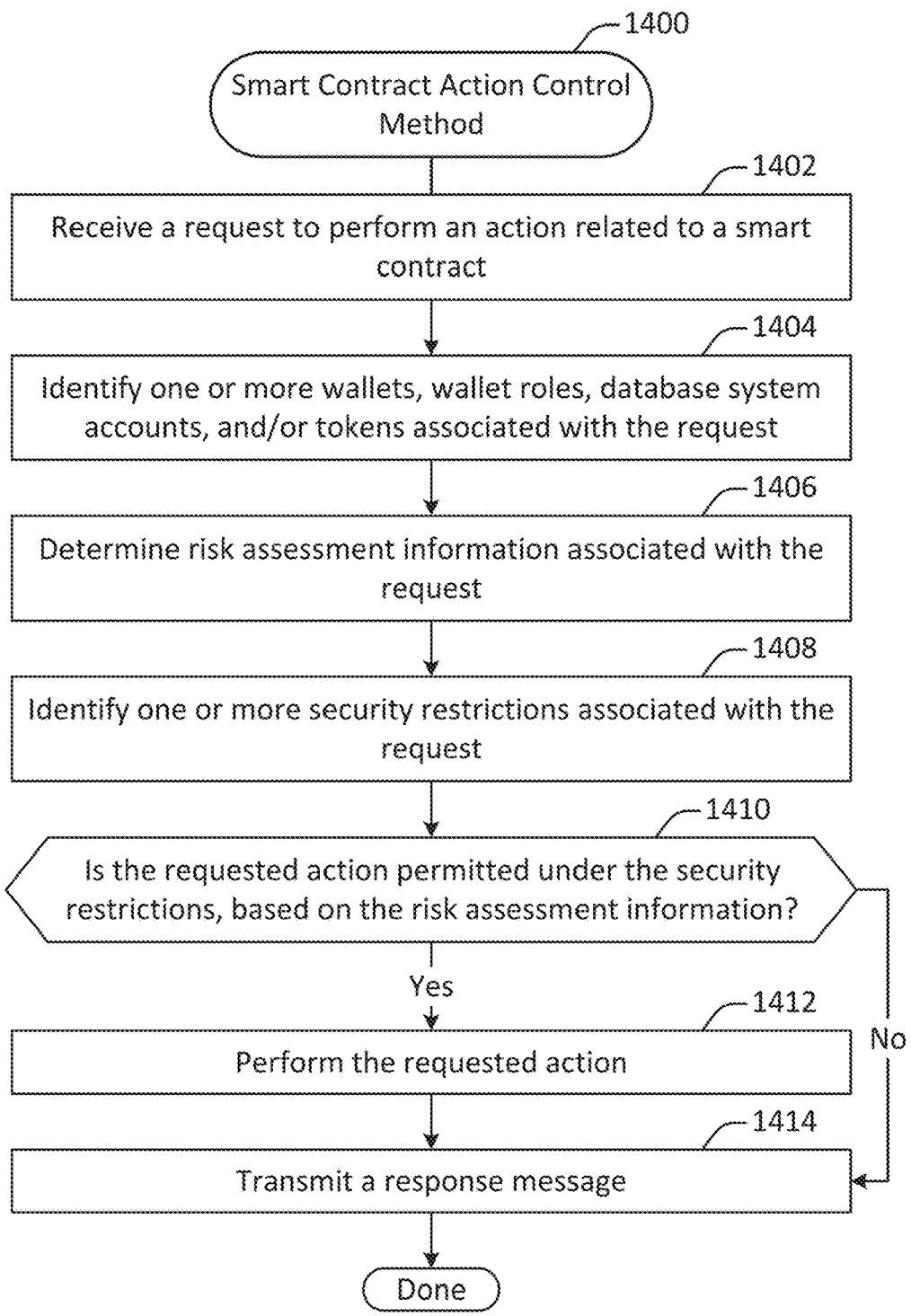
FIG. 14 illustrates one example of a method of controlling actions related to a smart contract, performed in accordance with one or more embodiments.

FIG. 14 illustrates one example of a method 1400 of controlling actions related to a smart contract, configured in accordance with one or more embodiments. The method 1400 may be used to determine whether to permit an action such as minting a new token with a smart contract or transferring a token from one party to another.

According to various embodiments, the method 1400 may be implemented by one or more computing devices within a computing system such as the on-demand database systems discussed with respect to FIG. 16, FIG. 17A, FIG. 17B, and FIG. 18. However, as discussed below, the method 1400 may be used to control access to such actions even when they are initiated outside the on-demand database system.

A request to perform an action related to a smart contract is received at 1402. According to various embodiments, any of various types of actions may be requested. Such actions may include, but are not limited to: minting a new token, transferring a token from one party to another, changing a mutable value associated with a token, changing a role associated with the smart contract, or any other suitable type of action.

In some implementations, the request may be received directly at the database system. For example, as discussed herein, the database system may act on behalf of parties to perform actions with respect to the blockchain. The database system may maintain, for instance, a private key associated with an account within a blockchain, and then use a private key to act on the party's behalf.

In some embodiments, the request may instead be received from outside the database system. For example, the database system may provide an application procedure interface (API) for responding to action authorization requests. Then, a smart contract that includes an action control function may be deployed to the blockchain. When the smart contract is executed and receives a request to perform an action, the action control function may first communicate with the API as an oracle outside the smart contract to provide to the smart contract an indicate as to whether the action is permitted.

One or more wallets, wallet roles, database system accounts, and/or tokens associated with the request are identified at 1404. In some implementations, such wallets, roles, accounts, and/or tokens may be known to the database system. The database system may know of such information either because the smart contracts and tokens were created by the database system. Alternatively, the database system may know of such information because such information was previously imported into the database system.

In some configurations, such wallets, roles, accounts, and/or tokens may not be known to the database system. In such a situation, such information may be retrieved directly from the blockchain, via operations such as those discussed with respect to the method 1300 shown in FIG. 13.

Risk assessment information associated with the request is identified at 1406. In some embodiments, risk assessment information may be identified by consulting one or more third-party security information providers. Alternatively, such information may be identified directly by the database system itself.

According to various embodiments, any or all of a variety of information may be identified related to security, legality, and/or risk. For example, a wallet involved in a requested transaction may have been funded by a bank account that has been identified as being associated with fraudulent activity. As another example, an account associated with a selected transaction may be identified as having been associated with wash trading, where a token is sold from one account associated with a party to a different account associated with the same party at an exorbitant price. As yet another example, an account associated with a selected transaction may have been identified as attempting to circumvent a restriction such as a maximum number of tokens of a particular type owned by a particular owner through establishing multiple wallets and/or related accounts.

One or more security restrictions associated with the request are identified at 1408. According to various embodiments, any or all of a variety of security restrictions may be applicable. For example, the database system may impose one or more restrictions based on a legal regime outside the database system. As another example, the database system may impose one or more restrictions to all transactions performed with smart contracts controlled by the database system. As yet another example, an account related to the transaction, such as the owner of the collection of NFTs minted by the smart contract, may impose one or more security restrictions on transactions pertaining to the minted NFTs.

According to various embodiments, such security restrictions may be stored within the database system, and may be specified at the level of the database system as a whole, an individual entity within the database system, a smart contract, a token, or any other suitable unit of analysis.

According to various embodiments, security restrictions may take potentially many forms. Such forms may include, but are not limited to: a maximum price associated with a token transfer, a maximum number of tokens that may be held by a single account, one or more characteristics of accounts that may not purchase or sell tokens, a maximum risk score associated with an account, any other suitable restrictions, or combinations thereof.

A determination is made at 1410 as to whether the requested action is permitted under the security restrictions, based on the risk assessment information. In some implementations, the determination may be made by applying the security restrictions identified at 1408 to the requested action in view of the risk assessment information identified at 1406.

If the action is permitted, then the requested action is performed at 1412. A response message is transmitted at 1414. In some embodiments, the requested action may be performed in the blockchain by the database system itself, as discussed herein. Alternatively, if the database system exposes an API that serves as an oracle for transactions conducted on the blockchain outside the database system, then the database system may transmit a response message to the smart contract that transmitted the request received at 1402.

According to various embodiments, the method 1400 may be used to allow the owner of a smart contract to pause and/or resume trading of tokens minted via the smart contract. For example, the owner of the smart contract may implement a rule pausing trading of a designated token or set of tokens. For example, the owner of the smart contract may implement a rule pausing trading to or from a designated wallet address. For example, the owner of the smart contract may implement a rule pausing trading of all tokens minted by a designated smart contract.

According to various embodiments, the method 1400 may be used to allow the owner of a smart contract to pause and/or resume trading of tokens minted via the smart contract. For example, the owner of the smart contract may implement a rule pausing trading of a designated token or set of tokens. For example, the owner of the smart contract may implement a rule pausing trading to or from a designated wallet address. For example, the owner of the smart contract may implement a rule pausing trading of all tokens minted by a designated smart contract.

FIG. 15 illustrates a diagram of a public trust ledger synthetic party 1500, configured in accordance with one or more embodiments. The public trust ledger synthetic party 1500 includes an owner party 1502, one or more subordinate parties 1504, one or more public trust ledger synthetic party permission rules 1514, and a smart contract template 1520. The owner party 1502 includes an database system owner account ID 1506, one or more public trust ledger synthetic party keys 1508, and a public trust ledger owner ID 1522. The subordinate parties 1504 include the database system account ID A 1510 through the database system account ID N 1512. The public trust ledger synthetic party permission rules 1514 include the rule 1 1516 through the rule K 1518.

According to various embodiments, the public trust ledger synthetic party may be created in a database system. The public trust ledger synthetic party may be used to allow more than one entity to perform actions related to a smart contract template or instances of a smart contract template. For example, the entity that owns the public trust ledger synthetic party may perform actions such as minting tokens using the smart contract template 1520 and burning tokens created using the smart contract template 1520. The entity that owns the public trust ledger synthetic party may also delegate various types of actions to one or more of the subordinate parties. For instance, a subordinate party may be authorized to transfer a token between two parties.

In some implementations, the owner party 1502 may be the party that exercises ultimate authority over the smart contract template or contract templates owned by the synthetic party 1500. For instance, the owner party 1502 may be the party that created or instigated the creation of the public trust ledger synthetic party and/or the smart contract template 1520.

According to various embodiments, the owner party 1502 may be identified within the database system by the database system account owner account ID 1506. For example, the owner party 1502 may be an entity such as an organization or individual accessing on-demand computer services via the on-demand database system.

According to various embodiments, the owner party 1502 may be identified on the public trust ledger by the public trust ledger owner id 1522. For instance, the public trust ledger owner id 1522 may be a unique identifier associated with a specific public trust ledger outside the database system. The public trust ledger may be the external location on which the smart contract template 1520 is recorded and on which transactions related to one or more tokens minted based on the smart contract template 1520 are stored.

In some implementations, the database system may manage interactions with the public trust ledger related to the smart contract template 1520 and/or instances of the smart contract template 1520 using the public trust ledger synthetic party keys 1522. The public trust ledger synthetic party keys 1522 may include one or more private keys for authenticating public trust ledger transactions by the public trust ledger owner ID 1522. Typically, a public trust ledger allows for only a single owner, designated by a public trust ledger account ID, for a particular smart contract. Accordingly, to facilitate transactions with the public trust ledger, the public trust ledger synthetic party keys 1508 may be stored within the database system.

In some implementations, the public trust ledger synthetic party keys 1508 may be generated within the public trust ledger by the owner party and then provided to the database system for storage. Alternatively, the database system may generate the public trust ledger synthetic party keys 1508 on behalf of the owner party. In either case, the owner party may be able to request the public trust ledger synthetic party keys 1508 from the database system and/or change the public trust ledger synthetic party keys within the public trust ledger. In particular embodiments, the public trust ledger synthetic party keys 1508 may be stored within a public trust ledger wallet, which in turn may be stored in the database system.

According to various embodiments, the subordinate parties 1504 include one or more database system account IDs associated with accounts within the database system. Each database system account may correspond with an individual or an organization such as a company accessing on-demand computing services via the database system. Subordinate parties may be identified by the creator of the public trust ledger synthetic party 1500. Additional details regarding the creation of the public trust ledger synthetic party 1500 are discussed with respect to the method 2400 shown in FIG. 24.

According to various embodiments, the smart contract template 1520 may be any smart contract created in accordance with techniques and mechanisms described herein. The smart contract template may specify one or more rules for creating fungible and/or non-fungible tokens. Such tokens may then be embedded in one or more instances of the smart contract template 1520. Then, the one or more instances of the smart contract template 1520 may be used to perform actions such as transferring the tokens between parties, with those transactions being recorded on a public trust ledger. Although only a single smart contract template 1520 is shown in FIG. 15, in some implementations a public trust ledger synthetic party may be associated with more than one smart contract template.

In some implementations, the public trust ledger synthetic party permission rules 1514 include one or more rules related to actions that subordinate parties may take with respect to the smart contract template 1520 and/or instances of the smart contract template 1520. For example, a rule may identify one or more subordinate parties who are authorized to transfer a token minted based on the smart contract template 1520 to another party. As another example, a rule may identify one or more subordinate parties who are authorized to update a value stored within an instance of the smart contract template 1520.

In particular embodiments, a public trust ledger synthetic party may support the creation of jointly managed assets. For example, a set of companies such as an airline group may collaborate to create a joint loyalty point system in which points may be used among the different companies within the group.

According to various embodiments, FIG. 15 illustrates an implementation in which multiple parties may be authorized to perform blockchain-related interactions for a single smart contract via a database system. Alternatively, or additionally, one or more of the roles represented in FIG. 15 may be implemented in the blockchain itself. For example, a smart contract may be configured to include various roles associated with various types of authorized actions, and various blockchain account identifiers may be assigned those various roles within the smart contract itself. In such a configuration, it may be the case that party keys 1508 may not be stored within the database system. Instead, the owner party 1502 may interact with the smart contract template 1520 via one or more non-custodial wallets. Further, one or more of the subordinate parties 1510-1512 may interact with the smart contract template 1520 via a respective non-custodial wallet configuration.

Figure 16:
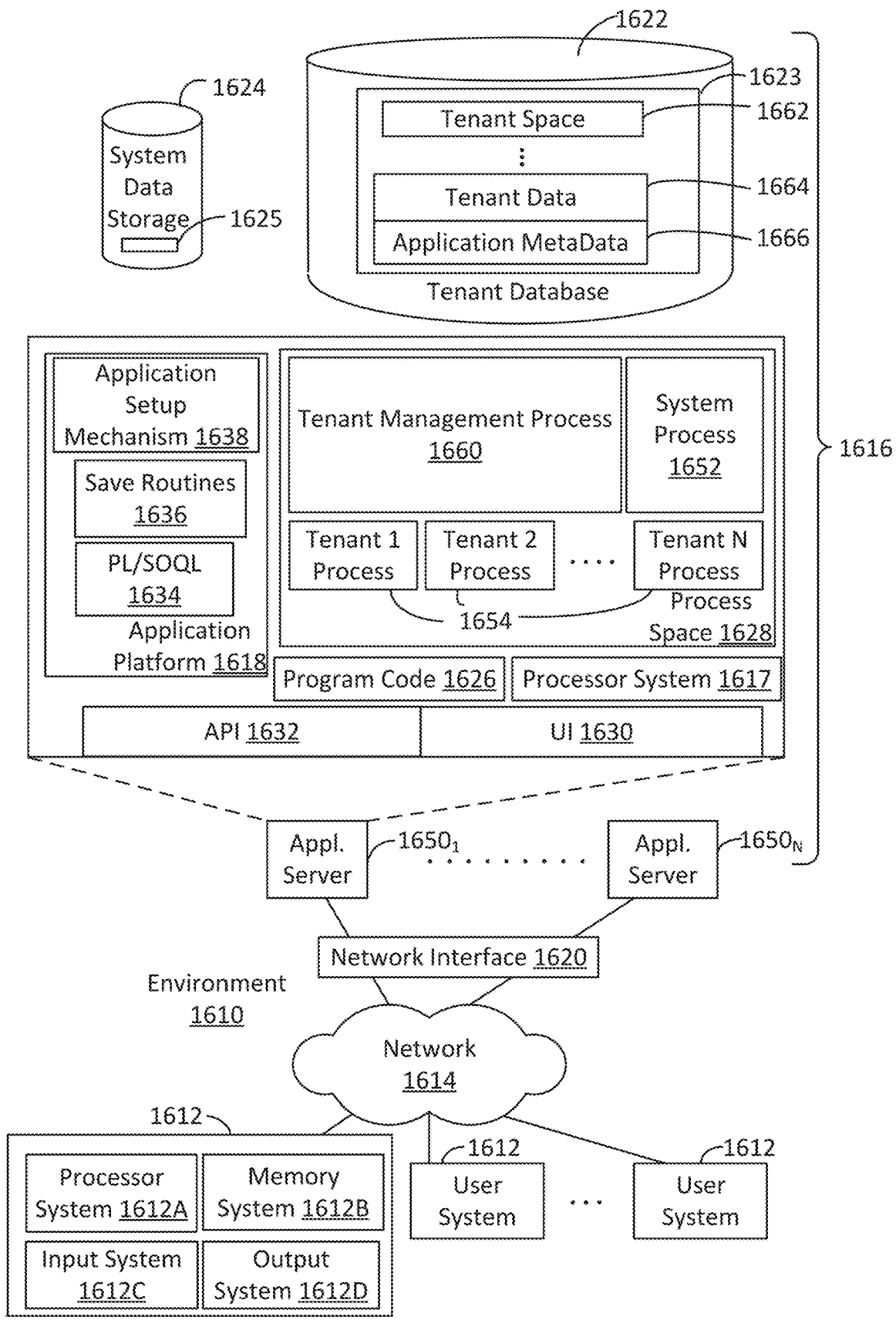
FIG. 16 shows a block diagram of an example of an environment that includes an on-demand database service configured in accordance with some implementations.

FIG. 16 shows a block diagram of an example of an environment 1610 that includes an on-demand database service configured in accordance with some implementations. Environment 1610 may include user systems 1612, network 1614, database system 1616, processor system 1617, application platform 1618, network interface 1620, tenant data storage 1622, tenant data 1623, system data storage 1624, system data 1625, program code 1626, process space 1628, User Interface (UI) 1630, Application Program Interface (API) 1632, PL/SOQL 1634, save routines 1636, application setup mechanism 1638, application servers 1650-1 through 1650-N, system process space 1652, tenant process spaces 1654, tenant management process space 1660, tenant storage space 1662, user storage 1664, and application metadata 1666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1618 may be a framework that allows the creation, management, and execution of applications in system 1616. Such applications may be developed by the database service provider or by users or third-party application developers accessing the service. Application platform 1618 includes an application setup mechanism 1638 that supports application developers' creation and management of applications, which may be saved as metadata into tenant data storage 1622 by save routines 1636 for execution by subscribers as one or more tenant process spaces 1654 managed by tenant management process 1660 for example. Invocations to such applications may be coded using PL/SOQL 1634 that provides a programming language style interface extension to API 1632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1666 for a subscriber making such an invocation. Such system processes may also manage execution of application metadata 1666 as an application in a virtual machine.

In some implementations, each application server 1650 may handle requests for any user associated with any organization. A load balancing function (e.g., an F5 Big-IP load balancer) may distribute requests to the application servers 1650 based on an algorithm such as least-connections, round robin, observed response time, etc. Each application server 1650 may be configured to communicate with tenant data storage 1622 and the tenant data 1623 therein, and system data storage 1624 and the system data 1625 therein to serve requests of user systems 1612. The tenant data 1623 may be divided into individual tenant storage spaces 1662, which can be either a physical arrangement and/or a logical arrangement of data. Within each tenant storage space 1662, user storage 1664 and application metadata 1666 may be similarly allocated for each user. For example, a copy of a user's most recently used (MRU) items might be stored to user storage 1664. Similarly, a copy of MRU items for an entire tenant organization may be stored to tenant storage space 1662. A UI 1630 provides a user interface and an API 1632 provides an application programming interface to system 1616 resident processes to users and/or developers at user systems 1612.

System 1616 may implement a web-based digital asset management system. For example, in some implementations, system 1616 may include application servers configured to implement and execute software applications related to creation, managing, and transferring digital assets. The application servers may be configured to provide related data, code, forms, web pages and other information to and from user systems 1612. Additionally, the application servers may be configured to store information to, and retrieve information from a database system. Such information may include related data, objects, and/or Webpage content. With a multi-tenant system, data for multiple tenants may be stored in the same physical database object in tenant data storage 1622, however, tenant data may be arranged in the storage medium(s) of tenant data storage 1622 so that data of one tenant is kept logically separate from that of other tenants. In such a scheme, one tenant may not access another tenant's data, unless such data is expressly shared.

Several elements in the system shown in FIG. 16 include conventional, well-known elements that are explained only briefly here. For example, user system 1612 may include processor system 1612A, memory system 1612B, input system 1612C, and output system 1612D. A user system 1612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1612 to access, process and view information, pages and applications available from system 1616 over network 1614. Network 1614 may be any network or combination of networks of devices that communicate with one another, such as any one or any combination of a LAN (local area network), WAN (wide area network), wireless network, or other appropriate configuration.

The users of user systems 1612 may differ in their respective capacities, and the capacity of a particular user system 1612 to access information may be determined at least in part by "permissions" of the particular user system 1612. As discussed herein, permissions generally govern access to computing resources such as data objects, components, and other entities of a computing system, such as a digital asset management system, a social networking system, and/or a CRM database system. "Permission sets" generally refer to groups of permissions that may be assigned to users of such a computing environment. For instance, the assignments of users and permission sets may be stored in one or more databases of System 1616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1616 may provide on-demand database service to user systems 1612 using an MTS arrangement. By way of example, one tenant organization may be a company that employs a sales force where each salesperson uses system 1616 to manage their sales process. Thus, a user in such an organization may maintain contact data, leads data, customer follow-up data, performance data, goals and progress data, etc., all applicable to that user's personal sales process (e.g., in tenant data storage 1622). In this arrangement, a user may manage his or her sales efforts and cycles from a variety of devices, since relevant data and applications to interact with (e.g., access, view, modify, report, transmit, calculate, etc.) such data may be maintained and accessed by any user system 1612 having network access.

When implemented in an MTS arrangement, system 1616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1616 may also maintain system-level data usable by multiple tenants or other data. Such system-level data may include industry reports, news, postings, and the like that are sharable between tenant organizations.

In some implementations, user systems 1612 may be client systems communicating with application servers 1650 to request and update system-level and tenant-level data from system 1616. By way of example, user systems 1612 may send one or more queries requesting data of a database maintained in tenant data storage 1622 and/or system data storage 1624. An application server 1650 of system 1616 may automatically generate one or more SQL statements (e.g., one or more SQL queries) that are designed to access the requested data. System data storage 1624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. In some implementations, entity tables may store information related to smart contracts and/or digital asset management. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 17A:
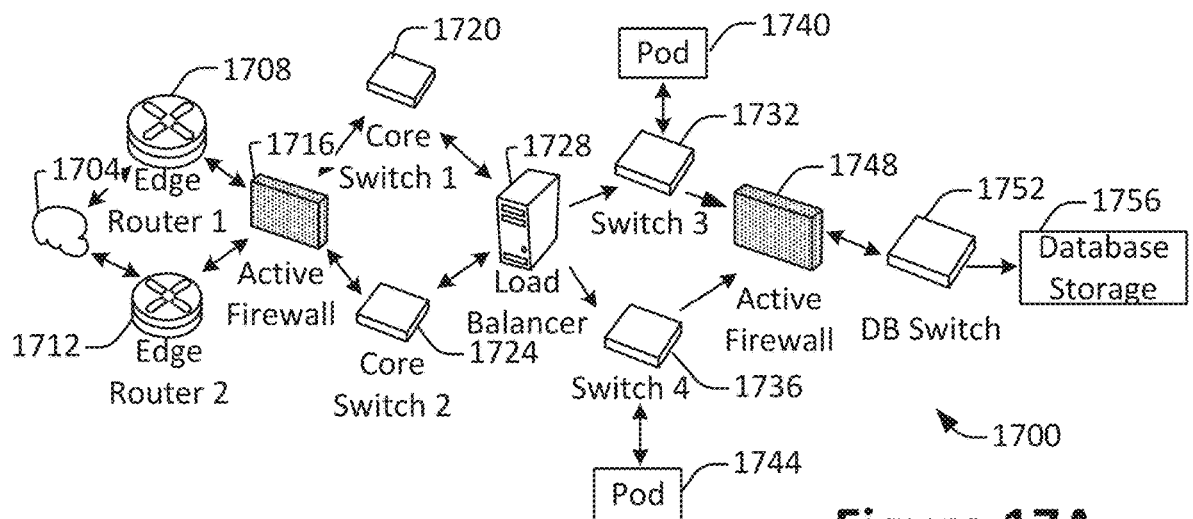
FIG. 17A shows a system diagram of an example of architectural components of an on-demand database service environment, configured in accordance with one or more embodiments.

FIG. 17A shows a system diagram of an example of architectural components of an on-demand database service environment 1700, configured in accordance with some implementations. A client machine located in the cloud 1704 may communicate with the on-demand database service environment via one or more edge routers 1708 and 1712. A client machine may include any of the examples of user systems 812 described above. The edge routers 1708 and 1712 may communicate with one or more core switches 1720 and 1724 via firewall 1716. The core switches may communicate with a load balancer 1728, which may distribute server load over different pods, such as the pods 1740 and 1744 by communication via pod switches 1732 and 1736. The pods 1740 and 1744, which may each include one or more servers and/or other computing resources, may perform data processing and other operations used to provide on-demand services. Components of the environment may communicate with a database storage 1756 via a database firewall 1748 and a database switch 1752.

Accessing an on-demand database service environment may involve communications transmitted among a variety of different components. The environment 1700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 17A and 17B.

The cloud 1704 refers to any suitable data network or combination of data networks, which may include the Internet. Client machines located in the cloud 1704 may communicate with the on-demand database service environment 1700 to access services provided by the on-demand database service environment 1700. By way of example, client machines may access the on-demand database service environment 1700 to retrieve, store, edit, and/or process public trust ledger and/or digital asset creation, management, and transfer information.

In some implementations, the edge routers 1708 and 1712 route packets between the cloud 1704 and other components of the on-demand database service environment 1700. The edge routers 1708 and 1712 may employ the Border Gateway Protocol (BGP). The edge routers 1708 and 1712 may maintain a table of IP networks or 'prefixes', which designate network reachability among autonomous systems on the internet.

In one or more implementations, the firewall 1716 may protect the inner components of the environment 1700 from internet traffic. The firewall 1716 may block, permit, or deny access to the inner components of the on-demand database service environment 1700 based upon a set of rules and/or other criteria. The firewall 1716 may act as one or more of a packet filter, an application gateway, a stateful filter, a proxy server, or any other type of firewall.

In some implementations, the core switches 1720 and 1724 may be high-capacity switches that transfer packets within the environment 1700. The core switches 1720 and 1724 may be configured as network bridges that quickly route data between different components within the on-demand database service environment. The use of two or more core switches 1720 and 1724 may provide redundancy and/or reduced latency.

In some implementations, communication between the pods 1740 and 1744 may be conducted via the pod switches 1732 and 1736. The pod switches 1732 and 1736 may facilitate communication between the pods 1740 and 1744 and client machines, for example via core switches 1720 and 1724. Also or alternatively, the pod switches 1732 and 1736 may facilitate communication between the pods 1740 and 1744 and the database storage 1756. The load balancer 1728 may distribute workload between the pods, which may assist in improving the use of resources, increasing throughput, reducing response times, and/or reducing overhead. The load balancer 1728 may include multilayer switches to analyze and forward traffic.

In some implementations, access to the database storage 1756 may be guarded by a database firewall 1748, which may act as a computer application firewall operating at the database application layer of a protocol stack. The database firewall 1748 may protect the database storage 1756 from application attacks such as structure query language (SQL) injection, database rootkits, and unauthorized information disclosure. The database firewall 1748 may include a host using one or more forms of reverse proxy services to proxy traffic before passing it to a gateway router and/or may inspect the contents of database traffic and block certain content or database requests. The database firewall 1748 may work on the SQL application level atop the TCP/IP stack, managing applications' connection to the database or SQL management interfaces as well as intercepting and enforcing packets traveling to or from a database network or application interface.

In some implementations, the database storage 1756 may be an on-demand database system shared by many different organizations. The on-demand database service may employ a single-tenant approach, a multi-tenant approach, a virtualized approach, or any other type of database approach. Communication with the database storage 1756 may be conducted via the database switch 1752. The database storage 1756 may include various software components for handling database queries. Accordingly, the database switch 1752 may direct database queries transmitted by other components of the environment (e.g., the pods 1740 and 1744) to the correct components within the database storage 1756.

Figure 17B:
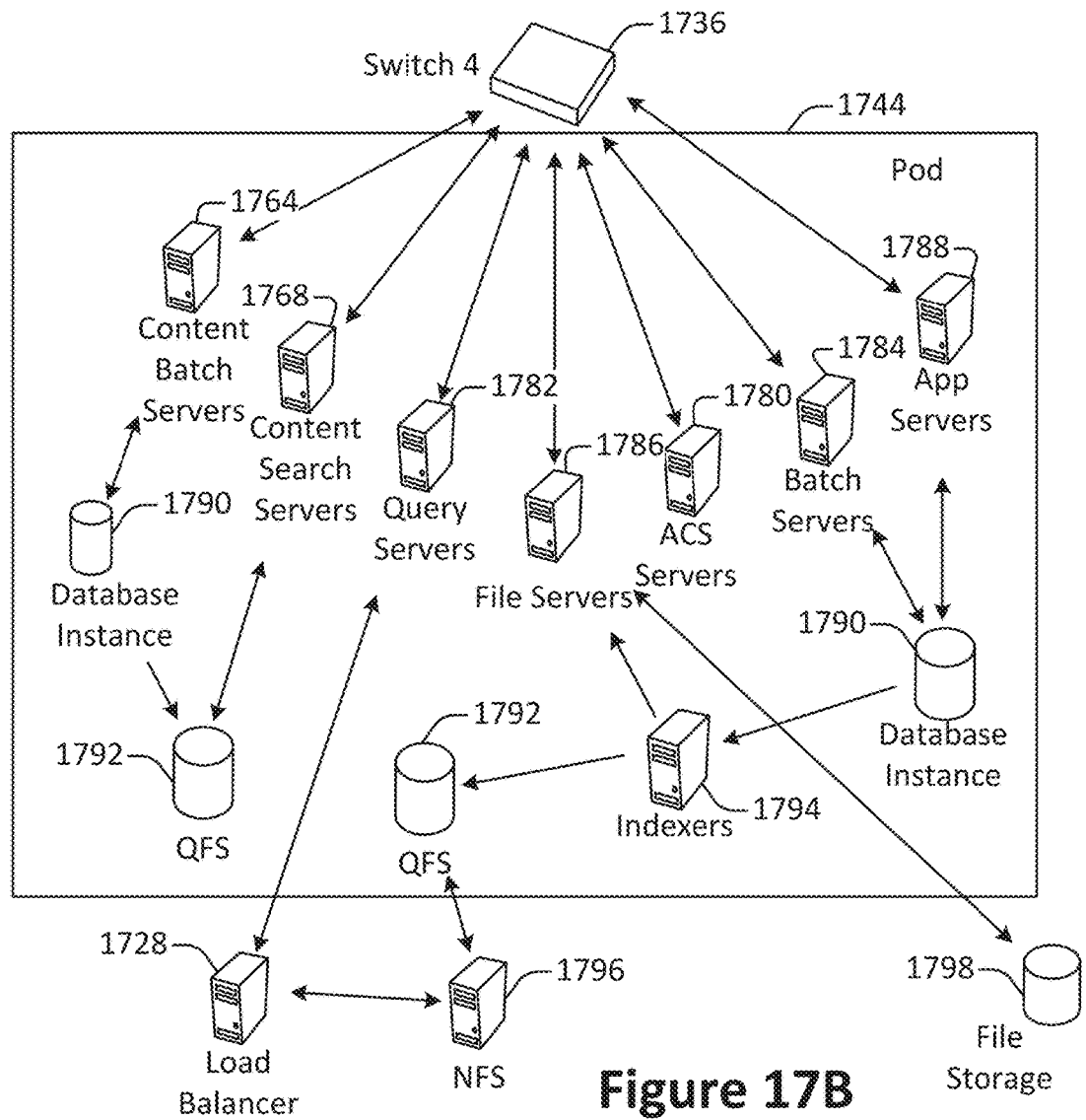
FIG. 17B shows a system diagram further illustrating an example of architectural components of an on-demand database service environment, configured in accordance with one or more embodiments.

FIG. 17B shows a system diagram further illustrating an example of architectural components of an on-demand database service environment, in accordance with some implementations. The pod 1744 may be used to render services to user(s) of the on-demand database service environment 1700. The pod 1744 may include one or more content batch servers 1764, content search servers 1768, query servers 1782, file servers 1786, access control system (ACS) servers 1780, batch servers 1784, and app servers 1788. Also, the pod 1744 may include database instances 1790, quick file systems (QFS) 1792, and indexers 1794. Some or all communication between the servers in the pod 1744 may be transmitted via the switch 1736.

In some implementations, the app servers 1788 may include a framework dedicated to the execution of procedures (e.g., programs, routines, scripts) for supporting the construction of applications provided by the on-demand database service environment 1700 via the pod 1744. One or more instances of the app server 1788 may be configured to execute all or a portion of the operations of the services described herein.

In some implementations, as discussed above, the pod 1744 may include one or more database instances 1790. A database instance 1790 may be configured as an MTS in which different organizations share access to the same database, using the techniques described above. Database information may be transmitted to the indexer 1794, which may provide an index of information available in the database 1790 to file servers 1786. The QFS 1792 or other suitable filesystem may serve as a rapid-access file system for storing and accessing information available within the pod 1744. The QFS 1792 may support volume management capabilities, allowing many disks to be grouped together into a file system. The QFS 1792 may communicate with the database instances 1790, content search servers 1768 and/or indexers 1794 to identify, retrieve, move, and/or update data stored in the network file systems (NFS) 1796 and/or other storage systems.

In some implementations, one or more query servers 1782 may communicate with the NFS 1796 to retrieve and/or update information stored outside of the pod 1744. The NFS 1796 may allow servers located in the pod 1744 to access information over a network in a manner similar to how local storage is accessed. Queries from the query servers 1722 may be transmitted to the NFS 1796 via the load balancer 1728, which may distribute resource requests over various resources available in the on-demand database service environment 1700. The NFS 1796 may also communicate with the QFS 1792 to update the information stored on the NFS 1796 and/or to provide information to the QFS 1792 for use by servers located within the pod 1744.

In some implementations, the content batch servers 1764 may handle requests internal to the pod 1744. These requests may be long-running and/or not tied to a particular customer, such as requests related to log mining, cleanup work, and maintenance tasks. The content search servers 1768 may provide query and indexer functions such as functions allowing users to search through content stored in the on-demand database service environment 1700. The file servers 1786 may manage requests for information stored in the file storage 1798, which may store information such as documents, images, basic large objects (BLOBS), etc. The query servers 1782 may be used to retrieve information from one or more file systems. For example, the query system 1782 may receive requests for information from the app servers 1788 and then transmit information queries to the NFS 1796 located outside the pod 1744. The ACS servers 1780 may control access to data, hardware resources, or software resources called upon to render services provided by the pod 1744. The batch servers 1784 may process batch jobs, which are used to run tasks at specified times. Thus, the batch servers 1784 may transmit instructions to other servers, such as the app servers 1788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 18:
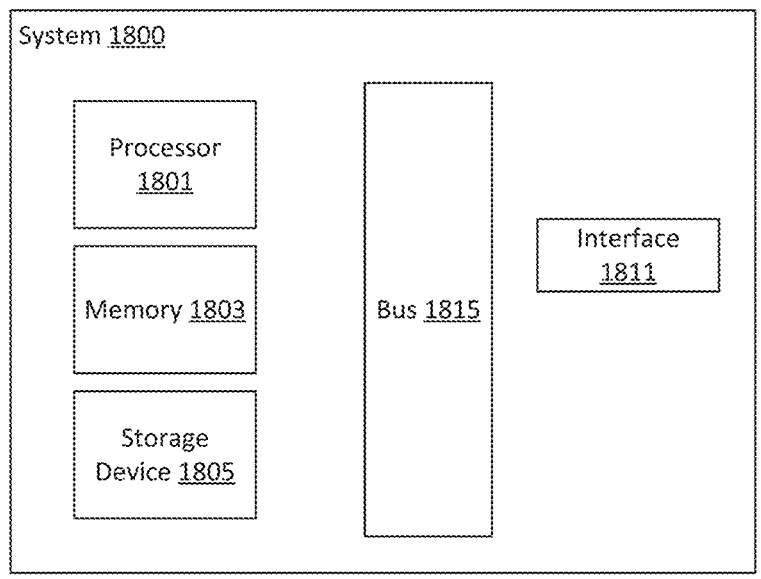
FIG. 18 illustrates one example of a computing device, configured in accordance with one or more embodiments.

FIG. 18 illustrates one example of a computing device, configured in accordance with one or more embodiments. According to various embodiments, a system 1800 suitable for implementing embodiments described herein includes a processor 1801, a memory module 1803, a storage device 1805, an interface 1811, and a bus 1815 (e.g., a PCI bus or other interconnection fabric.) System 1800 may operate as variety of devices such as an application server, a database server, or any other device or service described herein. Although a particular configuration is described, a variety of alternative configurations are possible. The processor 1801 may perform operations such as those described herein. Instructions for performing such operations may be embodied in the memory 1803, on one or more non-transitory computer readable media, or on some other storage device. Various specially configured devices can also be used in place of or in addition to the processor 1801. The interface 1811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 19:
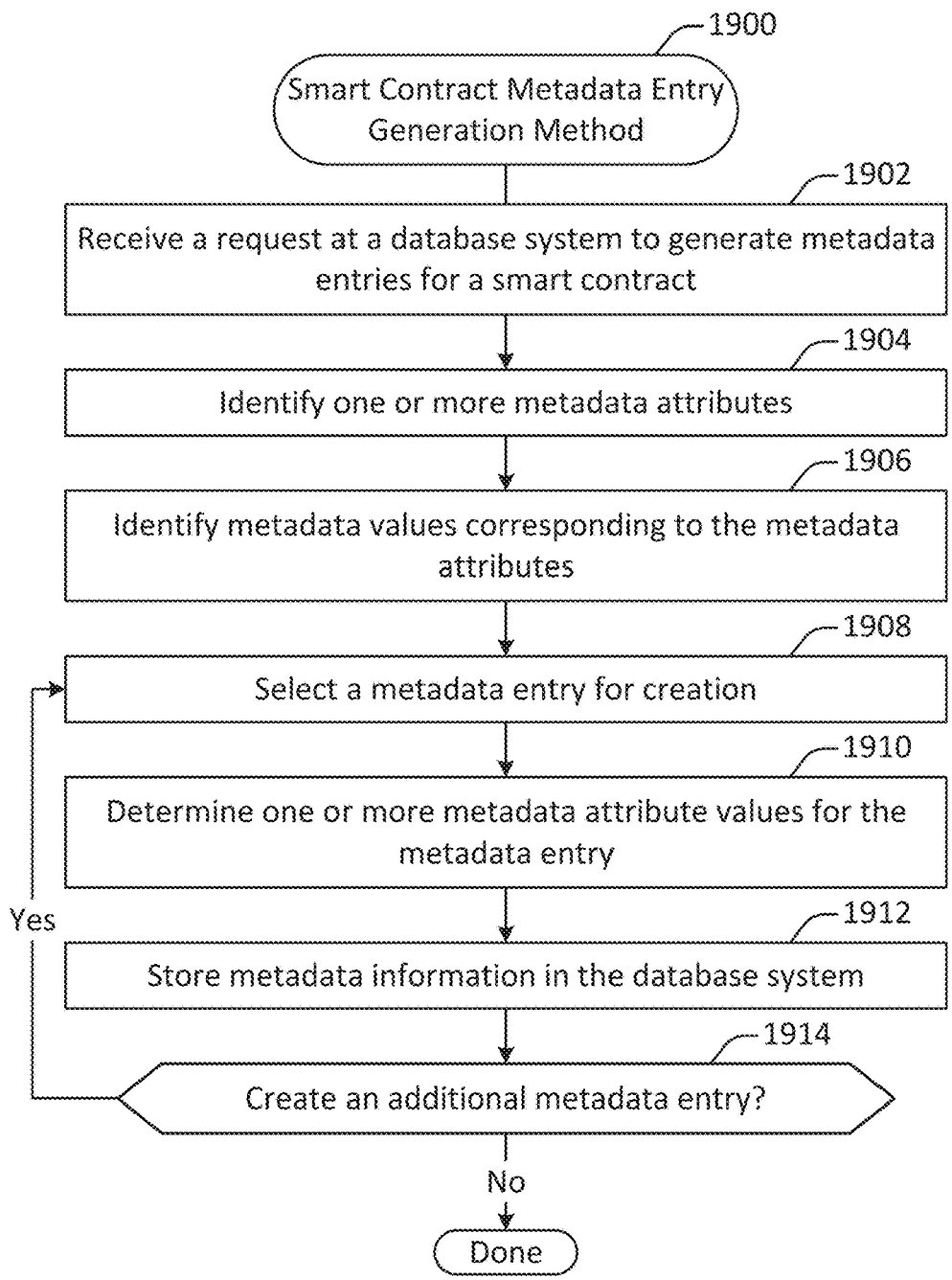
FIG. 19 illustrates a method for generating metadata entries for a smart contract, performed in accordance with one or more embodiments.

FIG. 19 illustrates a method 1900 for generating metadata entries for a smart contract, performed in accordance with one or more embodiments. The method 1900 may be used to create and store metadata entries and associated identifiers so that the entries may later be used to update tokens minted via the smart contract. According to various embodiments, the method 1900 may be implemented by one or more computing devices within a computing system such as the on-demand database systems discussed with respect to FIG. 16, FIG. 17A, FIG. 17B, and FIG. 18.

A request is received at a database system at 1902 to generate metadata entries for a smart contract. According to various embodiments, the request may be received from a database system account. For example, a user authorized to perform one or more actions on behalf of the database system account may provide the request via a graphical user interface, application procedure interface, or other suitable interface.

One or more metadata attributes are identified at 1904. In some implementations, the metadata attributes may be identified based on input associated with the request to generate the metadata entries. The metadata attributes may include one or more of various types of attributes that may be associated with data objects. Examples of particular types of metadata attributes are discussed in the following paragraphs.

In some embodiments, a metadata attribute may include an image, video, audio file, or other media representation. For instance, a metadata attribute may include an image, video, audio file, or other media representation of a character, a product, a work of art, or any other relevant subject.

In some embodiments, a metadata attribute may include an address or identifier. For example, a metadata attribute may include an identifier uniquely identifying a file within a file system. As another example, a metadata attribute may include a uniform resource locator (URL) or other web-related address. As yet another example, a metadata attribute may include an email address, a geographic address, an account identifier, or another type of addressor identifier.

In particular embodiments, a metadata attribute may include an address that uniquely identifies an image, video, audio file, or other media representation. For instance, the metadata attribute may uniquely identify a media representation stored in a publicly available location. One example of such a location is the InterPlanetary File System, a peer-to-peer hypermedia protocol. Another example of such a location is a media repository such as YouTube. Yet another example of such a location is a public trust ledger such as a blockchain. Still another example of such a location is Filecoin.

In some embodiments, a metadata attribute may include one or more text fields. Examples of text field metadata attributes may include, but are not limited to: color, shape, and size. Indeed, a text field metadata attribute may be user-configurable and therefore may include any property that a non-fungible token may possess.

Metadata values corresponding with the metadata attributes are identified at 1906. In some implementations, the metadata values may be identified based on input associated with the request to generate the metadata entries. The specific metadata values may depend on the metadata attributes identified at 1904. For example, suitable metadata attributes for the text field "color" may include the values "green," "red," and "blue," one or more of which are to be linked with a particular token. As another example, suitable metadata attributes for an image may include a set of some number of images, one or more of which are to be linked with a particular token.

A metadata entry is selected for creation at 1908. According to various embodiments, metadata entries may be selected for creation in sequence, in parallel, or in any suitable order.

One or more metadata attribute values are determined at 1910. In some implementations, the metadata entries may include combinations of attributes and attribute values. For example, a particular metadata entry for an image of a green sneaker may include the attribute/value combinations "color:green" and "type:sneaker". The metadata entry corresponding with the sneaker may also include an "image" attribute having as a value a URL or other identifier uniquely identifying the image of the sneaker where it is stored in the distributed file system, as discussed with respect to FIG. 20. The value may be determined as described with respect to the operation 1912.

In some implementations, particular values and/or combinations of values may be associated with a level of rarity. For example, the color "blue" may be associated with a rarity level identifying, for instance, a total number of times the color blue will occur, a frequency with which the color blue will occur, or a probability that the color blue will be selected for a given metadata entry. As another example, particular combinations of metadata attributes may be designated as having a particular level of rarity. Rarity levels may be determined based on user input, or may themselves be determined stochastically.

In particular embodiments, values or combinations of values may be segmented by type. For example, a token may have "rare" type that is known to the customer in advance and which guarantees a rare combination of attributes, the specific values of which are not revealed until after the customer receives the token.

In some embodiments, metadata entries combining metadata values for different attributes may be generated using a combinatorial approach. For example, a set of colors (e.g., red, green, blue) may be combined with a set of sizes (e.g., small, medium, large) to produce a number of unique metadata entries. Alternatively, or additionally, a stochastic approach may be used, with values being drawn from one or more statistical distribution. As yet another possibility, one or more combinations may be specified based on user input.

In some embodiments, a metadata entry may include one or more data objects such as an image file. Such a data object may be stored as an attribute value. Alternatively, or additionally, a data object may be stored outside the metadata entry, with an address or identifier associated with the data object stored as a value of a metadata entry attribute. When a metadata entry includes a data object, other metadata entry attributes may be selected so as to be consistent with the data object (or vice versa). For instance, a metadata entry may include as a data object an image of a green shoe of size medium. In such a configuration, the metadata entry may also include attribute/value combinations such as "size: medium" and "color: green."

Metadata information is stored in the database system at 1912. According to various embodiments, any or all of various types of information may be stored in the database system. Such information may include, but is not limited to: the identity of the smart contract, the metadata value identifiers, the metadata entries, the metadata attributes, the metadata values corresponding with those attributes, and combinations thereof.

A determination is made at 1914 as to whether to create an additional metadata entry. According to various embodiments, metadata entries may continue to be created, in sequence or in parallel, until one or more terminating conditions are met. Terminating conditions may include, but are not limited to: a designated number of metadata entries, a designated number of metadata entries of a particular type (e.g., rarity), a designated period of time, and/or any other suitable criteria or combination thereof.

Figure 20:
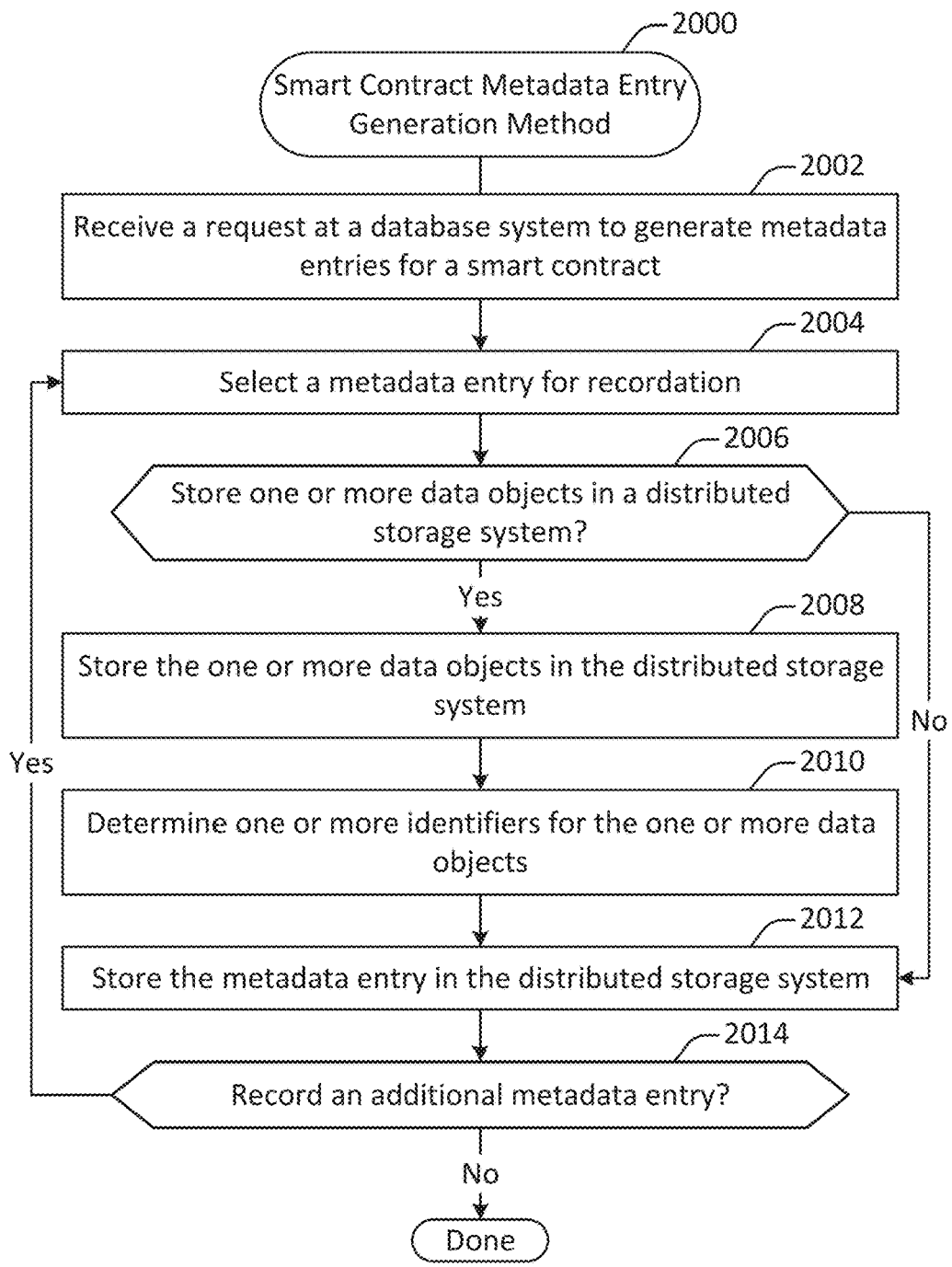
FIG. 20 illustrates a method for recording metadata entries for a smart contract, performed in accordance with one or more embodiments.

FIG. 20 illustrates a method 2000 for recording metadata entries for a smart contract, performed in accordance with one or more embodiments. The method 2000 may be used to store some or all of the metadata information in a public location so that the entries may later be used to update tokens minted via the smart contract. According to various embodiments, the method 2000 may be implemented by one or more computing devices within a computing system such as the on-demand database systems discussed with respect to FIG. 16, FIG. 17A, FIG. 17B, and FIG. 18.

A request is received at a database system at 2002 to record one or more metadata entries for a smart contract. According to various embodiments, the request may be received from a database system account. For example, a user authorized to perform one or more actions on behalf of the database system account may provide the request via a graphical user interface, application procedure interface, or other suitable interface.

A metadata entry is selected for recordation at 2004. According to various embodiments, metadata entries may be selected for recordation in sequence, in parallel, or in any suitable order. The metadata entries may be recorded as described with respect to FIG. 19.

A determination is made at 2006 as to whether to store one or more data objects in a distributed storage system. According to various embodiments, a data object may be any object that could potentially be included in or referenced by a metadata entry. For instance, a data object may be a media representation such as one or more image files, video files, audio files, or other types of media.

In some implementations, any data object associated with a metadata object may be stored in a distributed storage system. Alternatively, data objects may be stored in a distributed storage system only when they meet one or more criteria, such as exceeding a designated file size threshold.

A instruction is transmitted at 2008 to store some or all of the metadata values in a distributed storage system. According to various embodiments, the instruction may cause a set of media objects such as images, videos, audio files, and/or other media representations to be stored in a publicly accessible way. As used herein, the term "distributed storage system" may refer to any publicly accessible location at which metadata may be stored in a relatively permanent fashion. For instance, the distributed storage system may be the InterPlanetary File System.

In particular embodiments, data objects may be stored within the database system in addition to, or as part of, storage in the distributed storage system. For instance, in the context of the InterPlanetary File System, a copy of the data object may be "pinned" to the database system while a reference to the data object is uploaded to a remote location.

Identifiers corresponding with the metadata entries are determined at 2010. In some implementations, the identifiers may be provided by the distributed storage system. For example, the distributed storage system may respond to the request transmitted at 2008 with one or more identifiers corresponding with the metadata values stored in the distributed storage system. In such a configuration, the identifiers may be used to construct URLs or other addresses for accessing and uniquely identifying the metadata values.

In some embodiments, the identifiers may be determined by the database system. In such a configuration, the identifiers may be included with the instruction transmitted at 2008 so that the identifiers may be used to identify the metadata stored in the distributed storage system.

The metadata entry is stored in the distributed storage system at 2012. In some embodiments, a metadata entry may be formatted as a JavaScript Object Notation (JSON) file, Extensible Markup Language (XML) file, or other suitable format for storing metadata information.

According to various embodiments, the metadata entry may include some or all of the attribute values determined at 1910 and/or some or all of the identifiers determined at 2010. For example, a metadata entry for a green shoe of size medium may include attribute/value combinations of "size: medium" and "color: green", along with an attribute "image". The value corresponding with the attribute image may be the identifier or related URL facilitating access to an image of a green, medium-sized shoe stored within the distributed storage system.

A determination is made at 2014 as to whether to record an additional metadata entry. According to various embodiments, metadata entries may continue to be created, in sequence or in parallel, until one or more terminating conditions are met.

In particular embodiments, techniques and mechanisms described herein may be used to store different types of information in different locations to take advantage of the characteristics of the different storage locations. For example, relatively large but unstructured files such as media representations may be stored in a relatively fixed and publicly accessible location such as a distributed storage system. As another example, relatively small but structured files such as metadata attributes and text, address, or identifier values may be stored in a database system. As still another example, as discussed in the methods 2100 and 2200 shown in FIG. 21 and FIG. 22, linkages between particular tokens and particular metadata entries and values may be stored in an immutable location in the blockchain.

According to various embodiments, the operations shown in FIG. 20 may be performed in an order or configuration different than that shown. For example, in some configurations, the distributed storage system may store media items, while metadata entries including other metadata values may be stored in the database system. As another example, in some configurations, the distributed storage system may store metadata entries that include various metadata values, while the database system may store unique addresses or identifiers associated with these metadata entries.

Figure 21:
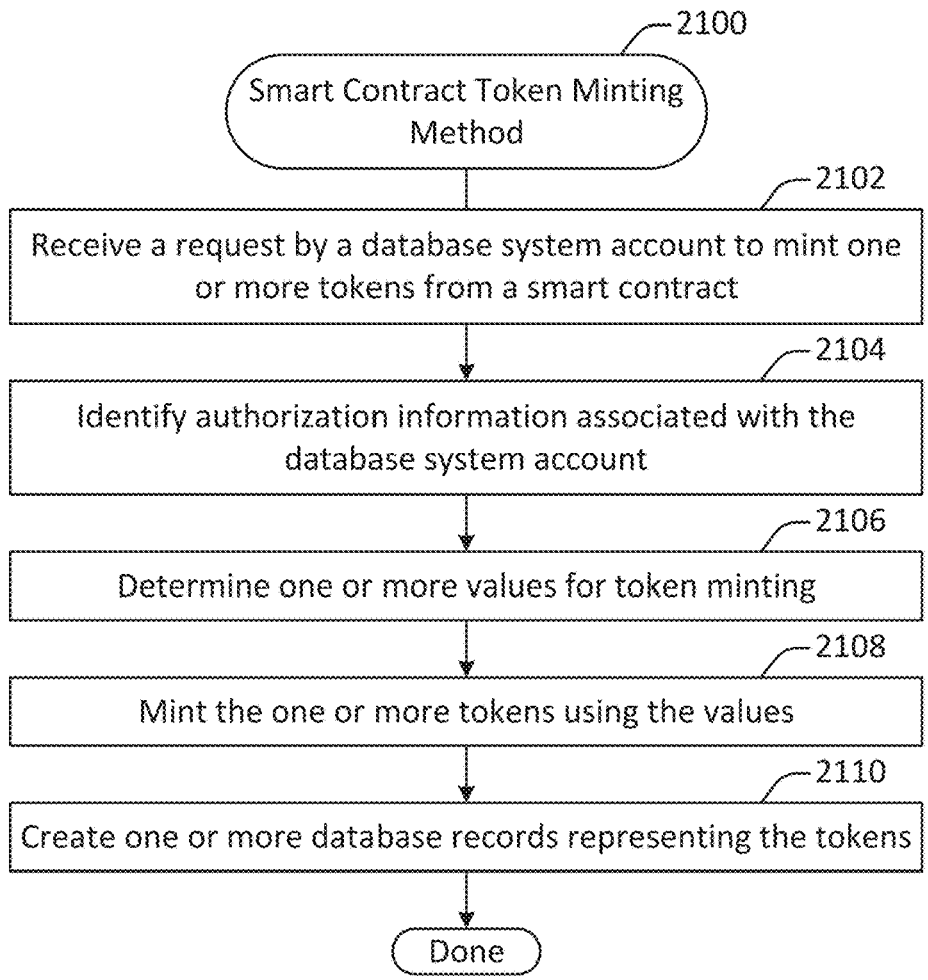
FIG. 21 illustrates a method for minting tokens using a smart contract, performed in accordance with one or more embodiments.

FIG. 21 illustrates a method 2100 for minting tokens using a smart contract, performed in accordance with one or more embodiments. The method 2100 may be used to mint tokens that may be subsequently linked to metadata entries generated as discussed with respect to FIGS. 19 and 20. According to various embodiments, the method 2100 may be implemented by one or more computing devices within a computing system such as the on-demand database systems discussed with respect to FIG. 16, FIG. 17A, FIG. 17B, and FIG. 18.

A request is received at 2102 by a database system account to mint one or more tokens from a smart contract. According to various embodiments, the database system account may be associated with a blockchain account that owns the smart contract. Such a relationship may be represented by one or more records within the database system, as shown with respect to the architecture diagram in FIG. 3.

In some implementations, the request may be received at 2102 after metadata entries have been generated as described with respect to FIGS. 19 and 20. Alternatively, the tokens may be minted first, and the metadata entries generated second. As still another possibility, the procedures may be performed in parallel.

In some implementations, the request may be received from a user authorized to perform one or more operations in the database system on behalf of the database system account. For instance, the request may be received via a graphical user interface, an application procedure interface, or any other suitable mechanism for communicating with the on-demand database system.

Authorization information associated with the database system account is identified at 2104. In some implementations, the authorization information may be collected at an earlier point in time and then stored within the database system. Alternatively, the authorization information may be provided as part of the method 2100. In either case, the authorization information may allow the database system to perform one or more blockchain-related applications on behalf of the database system account.

One or more values for token minting are determined at 2106. In some implementations, the one or more values may include a value that is common to all of the tokens being minted. Such values may include attributes like a product type or a product brand.

In some embodiments, the one or more values may include a value that are specific to particular tokens. For instance, a value such as "green" may be associated with an attribute such as "color".

In some embodiments, the one or more values may include a default value that is intended to be updated later, via a smart contract updating procedure such as the method 2200 shown in FIG. 22.

One or more tokens are minted using the values at 2108. In some implementations, the tokens may be minted by executing a smart contract deployed on a blockchain. As discussed with respect to the operation 2104, the smart contract may be executed by the database system acting on behalf of the database system account. Minting the tokens may involve providing to the smart contract the values determined at 2106.

One or more database records representing the tokens are created at 2110. According to various embodiments, the database records that are created may include any of the records shown in FIG. 3, or any other suitable records. For instance, each token may correspond with an asset or other entity within the database system.

Figure 22:
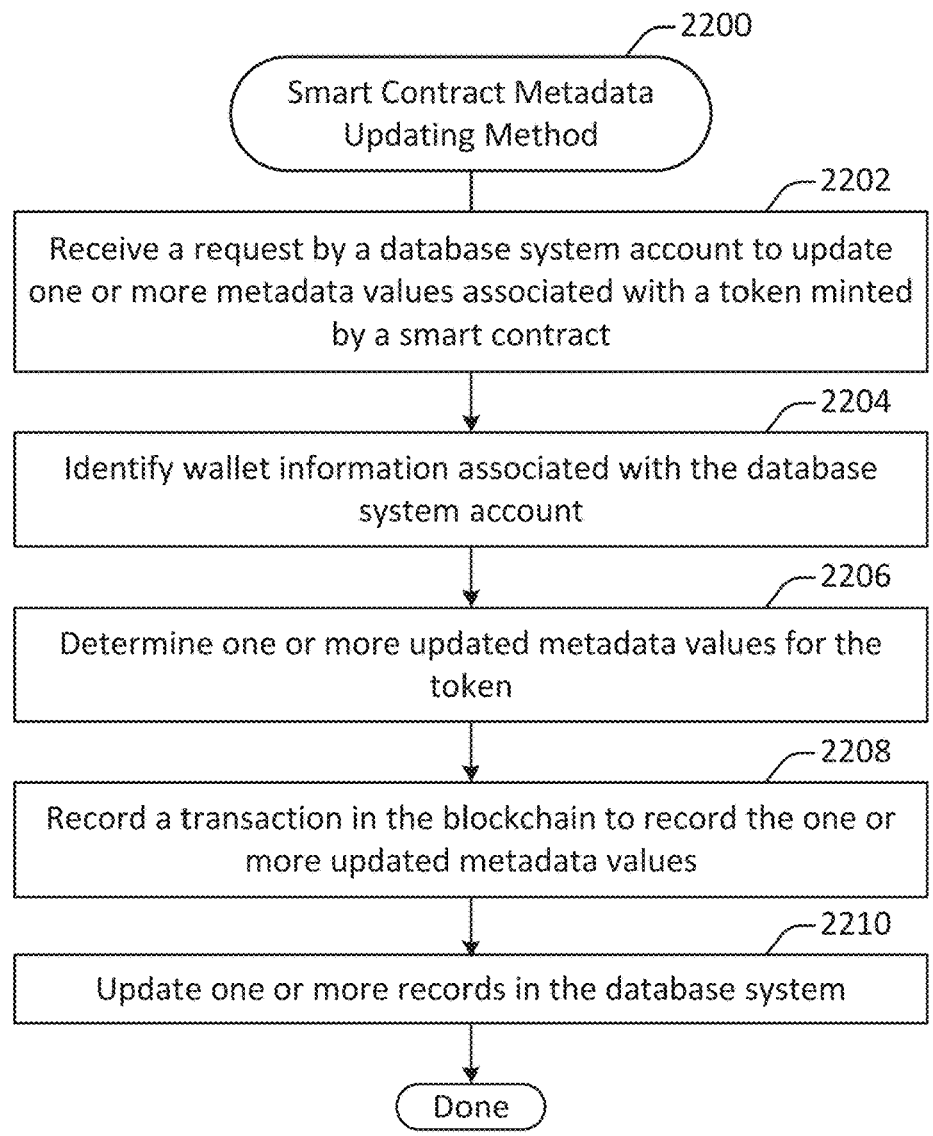
FIG. 22 illustrates a method for updating one or more tokens using a smart contract, performed in accordance with one or more embodiments.

FIG. 22 illustrates a method 2200 for updating one or more tokens using a smart contract, performed in accordance with one or more embodiments. The method 2200 may be used to update tokens that were minted in accordance with the method 2000 shown in FIG. 20 to link them with the metadata entries generated as discussed with respect to the method 1900 shown in FIG. 19. According to various embodiments, the method 2200 may be implemented by one or more computing devices within a computing system such as the on-demand database systems discussed with respect to FIG. 16, FIG. 17A, FIG. 17B, and FIG. 18.

According to various embodiments, some techniques and mechanisms described herein have been described as facilitating the updating of attributes of tokens after the tokens have been minted. However, these techniques and mechanisms may also be used to generate tokens having one or more attributes that are not fixed at the time. For instance, rather than generating a token having a default value, the token may be linked with a metadata entry created as discussed with respect to FIGS. 19 and 20 at the time of minting. In such a situation, the method 2200 shown in FIG. 22 need not be performed to update the metadata values that are defined at the time of minting.

A request is received by a database system account at 2202 to update one or more metadata values associated with a token minted by a smart contract. According to various embodiments, the request may be received from a user authorized to act on behalf of the database system account.

In some embodiments, the request may be received after one or more of the tokens have been transferred from the minter to a different party on the blockchain. In this way, the attribute values of one or more of the tokens may be revealed only after they have been initially transferred. Alternatively, one or more of the tokens may be updated before such a transfer has occurred.

Wallet information associated with the database system account is identified at 2204. According to various embodiments, wallet information may be identified in any of various ways. In a custodial wallet configuration, authorization information such as a private key may be received from the database system account via a communication interface or may be retrieved from the database system if it is already stored in the database system. In a non-custodial wallet configuration, a non-custodial wallet may be connected with the database system.

One or more updated metadata values for the token are determined at 2206. A transaction is recorded in the blockchain at 2208 to record the one or more updated metadata values. In some embodiments, the one or more updated metadata values may include a reference to one or more of the metadata entries created as described with respect to the method 1900 shown in FIG. 19.

In some implementations, the metadata values may be determined by executing a function in the smart contract. For instance, the smart contract may include a function that, when executed, determines one or more updated metadata values for a token and/or records a transaction in the blockchain to record the one or more updated metadata values.

In some embodiments, the smart contract may be configured so that the function may be used to update a given metadata value only once. For example, the smart contract may be configured to select only the first transaction updating a metadata value as informative, and ignore any subsequent transactions updating the metadata value. As another example, the function may be configured to terminate if a transaction updating a given metadata value for a token has already been recorded.

According to various embodiments, the updated metadata value may be determined in any of various ways. For example, the function may be configured to randomly (or pseudo-randomly) determine an updated metadata value. As another example, the function may be configured to retrieve an updated metadata value from an oracle such as an application procedure interface provided by the database system.

According to various embodiments, by updating the one or more metadata values and recording a transaction identifying the one or more updated values on the blockchain, the token may effectively have one or more potentially immutable attributes revealed after the token is minted. For instance, a customer may purchase or otherwise receive a token that initially lacks some or all of its salient characteristics. Then, after the token has been transferred, one or more of those salient characteristics may be revealed.

As one example of such a configuration, a brand may issue and transfer a number of tokens as part of a promotional event, and then reveal the value of those tokens either all at once or selectively after some or all of the tokens have been transferred. As another example of such a configuration, customers may purchase tokens having one or more unknown attributes in a sort of lottery, with the actual characteristics of the purchased tokens being revealed at a later point in time.

According to various embodiments, recording the transaction in the blockchain may be performed in any of various ways, depending on the configuration. In a custodial wallet configuration, the database system may execute the smart contract to determine the one or more updated values and record the transaction on behalf of the wallet owner. In a non-custodial configuration, the database may communicate with the non-custodial wallet to facilitate the same operations but performed outside the database system. For instance, the wallet owner may receive a message from the database system, which is signed with the wallet owner's private key to execute a smart contract and record a transaction in the blockchain.

One or more records in the database system are updated at 2210. According to various embodiments, the database system may be updated to include one or more records that identify the transaction recorded at 2208.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
  transmitting a plurality of metadata entries from a database system to a distributed storage system via a communication interface, the metadata entries corresponding with a respective plurality of metadata identifiers;
  executing a first function in a smart contract deployed on a blockchain to mint a designated non-fungible token initially owned by a first blockchain party corresponding with a database system account;
  identifying via a processor a first transaction transferring the designated non-fungible token to a second blockchain party different from the first blockchain party; and
  executing a second function in the smart contract to record a second transaction updating an attribute value associated with the designated non-fungible token to include a designated one of the plurality of metadata identifiers corresponding with a designated one of the metadata entries.

2. The method recited in claim 1, wherein the second function in the smart contract is configured to randomly or pseudo-randomly select the designated metadata identifier.

3. The method recited in claim 1, wherein the second function in the smart contract is configured to receive the designated metadata identifier from a remote location.

4. The method recited in claim 1, wherein the remote location is a communication interface associated with the database system.

5. The method recited in claim 1, the method further comprising:
  creating one or more database records in the database system representing the second transaction.

6. The method recited in claim 1, wherein the designated metadata entry includes a reference to a media representation.

7. The method recited in claim 6, wherein the media representation is an image.

8. The method recited in claim 6, wherein the reference to the media representation includes an identifier associated with the distributed storage system.

9. The method recited in claim 1, wherein the designated metadata entry includes one or more text values.

10. The method recited in claim 1, wherein the database system stores in a database a plurality of database objects corresponding with blockchain wallets, blockchain transactions, and blockchain tokens.

11. The method recited in claim 10, wherein the database is a dynamic schema database in which the plurality of database objects are stored in a designated database table.

12. The method recited in claim 1, wherein the smart contract is stored in a custodial wallet, and wherein the database system stores one or more credentials authorizing the database system to execute the smart contract on behalf of the database system account.

13. The method recited in claim 1, wherein the smart contract is stored in a non-custodial wallet, and wherein the non-custodial wallet is connected with the database system.

14. The method recited in claim 1, wherein the database system includes a multi-tenant database, and wherein the database system account is a tenant within the multi-tenant database.

15. A database system including a processor and memory, the database system configured to perform a method comprising:
- transmitting a plurality of metadata entries from the database system to a distributed storage system via a communication interface, the metadata entries corresponding with a respective plurality of metadata identifiers;
- executing a first function in a smart contract deployed on a blockchain to mint a designated non-fungible token initially owned by a first blockchain party corresponding with a database system account;
- identifying via the processor a first transaction transferring the designated non-fungible token to a second blockchain party different from the first blockchain party; and
- executing a second function in the smart contract to record a second transaction updating an attribute value associated with the designated non-fungible token to include a designated one of the plurality of metadata identifiers corresponding with a designated one of the metadata entries.

16. The database system recited in claim 15, wherein the second function in the smart contract is configured to randomly or pseudo-randomly select the designated metadata identifier.

17. The database system recited in claim 15, wherein the second function in the smart contract is configured to receive the designated metadata identifier from a remote location.

18. The database system recited in claim 15, wherein the remote location is a communication interface associated with the database system.

19. The database system recited in claim 15, wherein the designated metadata entry includes a reference to a media representation.

20. One or more non-transitory computer readable media having instructions stored thereon for performing a method, the method comprising:
- transmitting a plurality of metadata entries from a database system to a distributed storage system via a communication interface, the metadata entries corresponding with a respective plurality of metadata identifiers;
- executing a first function in a smart contract deployed on a blockchain to mint a designated non-fungible token initially owned by a first blockchain party corresponding with a database system account;
- identifying via a processor a first transaction transferring the designated non-fungible token to a second blockchain party different from the first blockchain party; and
- executing a second function in the smart contract to record a second transaction updating an attribute value associated with the designated non-fungible token to include a designated one of the plurality of metadata identifiers corresponding with a designated one of the metadata entries.

* * * * *